(12) United States Patent
Jun et al.

(10) Patent No.: US 11,661,547 B2
(45) Date of Patent: May 30, 2023

(54) QUANTUM DOT POLYMER COMPOSITES AND DEVICES INCLUDING THE SAME

(71) Applicants: SAMSUNG ELECTRONICS CO., LTD., Suwon-si (KR); Samsung SDI Co., Ltd., Yongin-si (KR); Samsung Display Co., Ltd., Yongin-si (KR)

(72) Inventors: Shin Ae Jun, Suwon-si (KR); Taekhoon Kim, Hwaseong-si (KR); Garam Park, Seoul (KR); Yong Seok Han, Anyang-si (KR); Eun Joo Jang, Suwon-si (KR); Hyo Sook Jang, Suwon-si (KR); Tae Won Jeong, Yongin-si (KR); Shang Hyeun Park, Yongin-si (KR)

(73) Assignees: SAMSUNG ELECTRONICS CO., LTD., Gyeonggi-Do (KR); SAMSUNG SDI CO., LTD., Gyeonggi-Do (KR); SAMSUNG DISPLAY CO., LTD., Gyeonggi-Do (KR)

( * ) Notice: Subject to any disclaimer, the term of this patent is extended or adjusted under 35 U.S.C. 154(b) by 247 days.

(21) Appl. No.: 16/883,989

(22) Filed: May 26, 2020

(65) Prior Publication Data
US 2020/0283680 A1 Sep. 10, 2020

Related U.S. Application Data

(63) Continuation of application No. 15/387,107, filed on Dec. 21, 2016, now Pat. No. 10,723,942.

(30) Foreign Application Priority Data

Dec. 23, 2015 (KR) .......................... 10-2015-0185062

(51) Int. Cl.
*C09K 11/62* (2006.01)
*C09K 11/70* (2006.01)
(Continued)

(52) U.S. Cl.
CPC .............. *C09K 11/025* (2013.01); *C08K 3/30* (2013.01); *C08K 3/32* (2013.01); *C09K 11/703* (2013.01);
(Continued)

(58) Field of Classification Search
CPC ..... C09K 11/883; C09K 11/025; C09K 11/70; C09K 11/02; C09K 11/565;
(Continued)

(56) References Cited

U.S. PATENT DOCUMENTS 6,630,793 B2  10/2003  Rubner et al.
7,200,318 B2   4/2007  Banin et al.
(Continued)

FOREIGN PATENT DOCUMENTS

JP    2015121702 A    7/2015
KR   1020140109377 A  9/2014

OTHER PUBLICATIONS

Jaehoon Lim, et al., "Highly Efficient Cadmium-Free Quantum Dot Light-Emitting Diodes Enabled by the Direct Formation of Excitons within InP@ZnSeS Quantum Dots", American Chemical Society, vol. 7, No. 10, 9019-9026, 2013.
(Continued)

*Primary Examiner* — Matthew E. Hoban
*Assistant Examiner* — Lynne Edmondson
(74) *Attorney, Agent, or Firm* — Cantor Colburn LLP

(57) ABSTRACT

A quantum dot, including a core including a first semiconductor material that includes indium; and a shell including a second semiconductor material, and disposed on the core, wherein the first semiconductor material and the second semiconductor material are different, wherein the shell has at least two branch portions and a valley portion connecting the at least two branch portions, at least one of the at least two branch portions comprises Zn, Se, and S, and a content
(Continued)

of sulfur in the at least one branch portion increases in a direction away from the core.

21 Claims, 15 Drawing Sheets

(51) Int. Cl.
| | |
|---|---|
| *C09K 11/08* | (2006.01) |
| *C09K 11/88* | (2006.01) |
| *C09K 11/56* | (2006.01) |
| *C09K 11/02* | (2006.01) |
| *C08K 3/32* | (2006.01) |
| *C08K 3/30* | (2006.01) |
| *G02F 1/1335* | (2006.01) |
| *G02F 1/13357* | (2006.01) |
| *B82Y 40/00* | (2011.01) |
| *B82Y 20/00* | (2011.01) |
| *B82Y 30/00* | (2011.01) |

(52) U.S. Cl.
CPC ...... *C09K 11/883* (2013.01); *G02F 1/133516* (2013.01); *G02F 1/133617* (2013.01); *B82Y 20/00* (2013.01); *B82Y 30/00* (2013.01); *B82Y 40/00* (2013.01); *C08K 2201/001* (2013.01); *G02F 2202/36* (2013.01); *Y10S 977/774* (2013.01); *Y10S 977/896* (2013.01); *Y10S 977/95* (2013.01)

(58) Field of Classification Search
CPC ... C09K 11/0883; C09K 11/703; C09K 11/62; C09K 11/88; C09K 11/54; C09K 11/58; C09K 11/64; C09K 11/7492; G02F 2202/102; G02F 1/133516; G02F 1/133514; C08K 3/30; C08K 3/32; B82Y 40/00
See application file for complete search history.

(56) References Cited

U.S. PATENT DOCUMENTS

| | | | |
|---|---|---|---|
| 8,749,130 B2 | 6/2014 | Parce et al. | |
| 9,793,446 B2 | 10/2017 | Kurtin et al. | |
| 9,890,329 B2 | 2/2018 | Chen et al. | |
| 10,074,780 B2 | 9/2018 | Kurtin et al. | |
| 10,723,942 B2* | 7/2020 | Jun | C09K 11/883 |
| 11,205,741 B2 | 12/2021 | Kurtin et al. | |
| 2009/0246649 A1* | 10/2009 | Takakuwa | G03F 7/0007 430/7 |
| 2010/0207066 A1 | 8/2010 | Drndic et al. | |
| 2010/0289003 A1 | 11/2010 | Kahen et al. | |
| 2013/0112940 A1 | 5/2013 | Kurtin et al. | |
| 2013/0112942 A1 | 5/2013 | Kurtin et al. | |
| 2013/0115455 A1* | 5/2013 | Banin | C09K 11/883 977/773 |
| 2015/0152323 A1 | 6/2015 | Delaat et al. | |
| 2015/0203747 A1* | 7/2015 | Haley | H01L 33/502 252/301.36 |
| 2022/0085254 A1 | 3/2022 | Kurtin et al. | |

OTHER PUBLICATIONS

Aehoon Lim, et al., "InP@ZnSes, Core@Composition Gradient Shell Quantum Dots with Enhanced Stability", Chem. Mater. 2011, 23, 4459-4463.

English Translation of Office Action dated Feb. 20, 2023 of the corresponding Korean Patent Application No. 10-2015-0185062, 5 pp.

Office Action dated Feb. 20, 2023 of the corresponding Korean Patent Application No. 10-2015-0185062, 6 pp.

* cited by examiner

Pattern Preparation by using a photoresist

Repeating the Patterning Process three times

QUANTUM DOT POLYMER COMPOSITES AND DEVICES INCLUDING THE SAME

CROSS-REFERENCE TO RELATED APPLICATIONS

This application is a continuation of U.S. patent application Ser. No. 15/387,107, filed Dec. 21, 2016, and claims priority to Korean Patent Application No. 10-2015-0185062 filed in the Korean Intellectual Property Office on Dec. 23, 2015, and all the benefits accruing therefrom under 35 U.S.C. § 119, the contents of both of which are incorporated herein in their entirety by reference.

BACKGROUND

1. Field

Quantum dot-polymer composites and devices including the same are disclosed.

2. Description of the Related Art

By controlling the size and composition of a nanocrystal, one can obtain a quantum dot (i.e., a nano-sized semiconductor nanocrystal) having different energy bandgaps. These quantum dots may emit light of various photoluminescence wavelengths. As the quantum dot has a theoretical quantum yield (QY) of 100% and emits light having a high color purity (e.g., full width at half maximum (FWHM) of less than or equal to about 40 nanometers), the quantum dot as a light emitting material may realize increased luminous efficiency and improved color reproducibility. In a wet chemical method, an organic materials such as dispersing agents are coordinated to the surface of semiconductor crystal during crystal growth. As a result, quantum dots having uniformly controlled sizes, good photoluminescence properties, and high stability may be provided. Such a quantum dot may have, for example a core-shell structure. However, most quantum dots having a core-sell structure and good photoluminescence properties (e.g., quantum efficiency and full width at half maximum (FWHM)) include cadmium. As cadmium is an element causing serious environmental problems, it is desired to provide a cadmium-free semiconductor nanocrystal particle, while retaining excellent photoluminescence properties.

SUMMARY

An embodiment provides a quantum dot-polymer composite having improved photo-conversion efficiency and which is patternable.

Another embodiment provides an electronic device including the quantum dot-polymer composite or a pattern thereof.

A quantum dot polymer composite according to an embodiment includes:
 a polymer matrix; and
 a plurality of quantum dots dispersed in the polymer matrix,
 wherein the quantum dot includes a core including a first semiconductor material and a shell including a second semiconductor material disposed on the core,
 wherein the quantum dot is cadmium-free,
 wherein the shell has at least two branches and at least one valley portion connecting the at least two branches, and
 wherein the first semiconductor material is different from the second semiconductor material.

The shell may surround the whole surface of the core.
The shell may have three or more of branches.
The shell may have a thickness of greater than or equal to about 1.7 nanometers.
The shell may have a thickness of greater than or equal to about 2.0 nanometers.
In the semiconductor nanocrystal particle, a depth of the at least one valley portion may be greater than 0.
The branches may have a composition that is different depending on a length.
The core and the shell may have the same crystal structure at the interface therebetween.
The crystal structure may be a zinc blend or a wurtzeit.
The first semiconductor material may include a Group II-VI compound, a Group III-V compound, a Group IV-VI compound, a Group IV element or compound, a Group compound, a Group compound, a Group I—II—IV-VI compound, or a combination thereof.

The second semiconductor material may include a Group II-VI compound, a Group III-V compound, a Group IV-VI compound, a Group IV element or compound, a Group compound, a Group compound, a Group I-II-IV-VI compound, or a combination thereof.

The Group II-IV compound may be selected from a binary element compound selected from ZnS, ZnSe, ZnTe, ZnO, HgS, HgSe, HgTe, MgSe, MgS, and a combination thereof; a ternary element compound selected from ZnSeS, ZnSeTe, ZnSTe, HgSeS, HgSeTe, HgSTe, CdZnS, HgZnS, HgZnSe, HgZnTe, MgZnSe, MgZnS, and a combination thereof; and a quaternary element compound selected from HgZnTeS, HgZnSeS, HgZnSeTe, HgZnSTe, and a combination thereof.

The Group III-V compound may be selected from a binary element compound selected from GaN, GaP, GaAs, GaSb, AlN, AlP, AlAs, AlSb, InN, InP, InAs, InSb, and a combination thereof; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and a quaternary element compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from a binary element compound selected from SnS, SnSe, SnTe, PbS, PbSe, PbTe, and a combination thereof; a ternary element compound selected from SnSeS, SnSeTe, SnSTe, PbSeS, PbSeTe, PbSTe, SnPbS, SnPbSe, SnPbTe, and a combination thereof; and a quaternary element compound selected from SnPbSSe, SnPbSeTe, SnPbSTe, and a combination thereof.

The Group compound may be selected from $CuInSe_2$, $CuInS_2$, CuInGaSe, CuInGaS, and a combination thereof.

The Group I-II-IV-VI compound may be selected from CuZnSnSe, CuZnSnS, and a combination thereof.

The Group compound may be selected from ZnGaS, ZnAlS, ZnInS, ZnGaSe, ZnAlSe, ZnInSe, ZnGaTe, ZnAlTe, ZnInTe, ZnGaO, ZnAlO, ZnInO, HgGaS, HgAlS, HgInS, HgGaSe, HgAlSe, HgInSe, HgGaTe, HgAlTe, HgInTe, MgGaS, MgAlS, MgInS, MgGaSe, MgAlSe, MgInSe, and a combination thereof.

The Group IV element or compound may be selected from a single-element compound selected from Si, Ge, and a combination thereof; and a binary element compound selected from SiC, SiGe, and a combination thereof.

The core may include a Group III-V compound and the shell may include a Group II-VI compound.

The core may include indium and the shell may include three or more elements.

The core may further include Zn.

The quantum dot may have quantum efficiency of greater than or equal to about 75%.

The quantum dot may have two or more cores.

The quantum dot-polymer composite may be patterned to have a first color section, a second color section, and optionally, a third color section. The quantum dot of the first color section may emit light of a peak emission wavelength of about 620 nanometers to about 650 nanometers, and the quantum dot of the second color section may emit light of a peak emission wavelength of about 520 nanometers to about 550 nanometers.

In the quantum dot polymer composite, the polymer matrix may include a carboxylic acid group-containing binder having an acid value of greater than or equal to about 50 milligrams of potassium hydroxide (KOH) per gram of the binder.

The carboxylic acid group-containing binder may include:

a copolymer of a monomer combination including a first monomer including a carboxylic acid group and a carbon-carbon double bond, a second monomer including a carbon-carbon double bond and a hydrophobic moiety and not including a carboxylic acid group, and optionally, a third monomer including a carbon-carbon double bond and a hydrophilic moiety and not including a carboxylic acid group;

a multiple aromatic ring-containing polymer including a carboxylic acid group and a main chain having a backbone structure incorporated in the main chain, wherein the backbone structure includes a quaternary carbon atom, which is a part of a cyclic group, and two aromatic rings bound to the quaternary carbon atom; or a combination thereof. The carboxylic acid group may be included in the main chain.

The polymer matrix may further include a radical polymerization product of a photopolymerizable acryl monomer, a radical polymerization product of the photopolymerizable acryl monomer and a reactive compound having at least two thiol groups and represented by Chemical Formula 2, or a combination thereof:

Chemical Formula 2

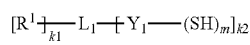

wherein, in Chemical Formula 2, $R^1$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; —$NH_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), $L_1$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein at least one methylene (—$CH_2$—) of the substituted or unsubstituted C1 to C30 alkylene group may be replaced by sulfonyl (—$SO_2$—), carbonyl (—CO—), ether (—O—), sulfide (—S—), sulfoxide (—SO—), ester (—O(=O)O—), amide (—O(=O)NR—) (wherein R is hydrogen or a C1 to C10 alkyl group) or a combination thereof, $Y_1$ is a single bond; a substituted or unsubstituted C1 to C30 alkylene group; a substituted or unsubstituted C2 to C30 alkenylene group; a substituted C1 to C30 alkylene group or a C2 to C30 alkenylene group wherein at least one methylene (—$CH_2$—) is replaced by sulfonyl (—S(=O)$_2$—), carbonyl (—O(=O)—), ether (—O—), sulfide (—S—), sulfoxide (—S(=O)—), ester (—O(=O)O—), amide (—O(=O)NR—) (wherein R is hydrogen or a C1 to C10 linear or branched alkyl group), imine (—NR—) (wherein R is hydrogen or a C1 to C10 linear or branched alkyl group) or combination thereof, m is an integer of 1 or more, k1 is 0 or an integer of 1 or more, k2 is an integer of 1 or more, and a sum of m and k2 is an integer of 3 or more, provided that when $Y_1$ is not a single bond, m does not exceed the valence of $Y_1$, and provided that a sum of k1 and k2 does not exceed the valence of $L_1$.

The quantum dot-polymer composite may further include a light scatter selected from a metal oxide particle, a metal particle, and a combination thereof.

The quantum dot-polymer composite may have a photo-conversion rate of greater than or equal to about 45%.

In another embodiment, an electronic device including the quantum dot-polymer composite is provided.

The electronic device may be a light emitting diode (LED), an organic light emitting diode (OLED), a sensor, an imaging sensor, or a solar cell device, or a liquid crystal display (LCD) device.

According to some embodiments, the quantum dot-polymer composites may show enhanced luminous properties even when the quantum dot included in the composite is free of cadmium. The aforementioned quantum dot polymer composites may find their utility in various field such as a display device (having a photoluminescent color filter), a lighting, and the like.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
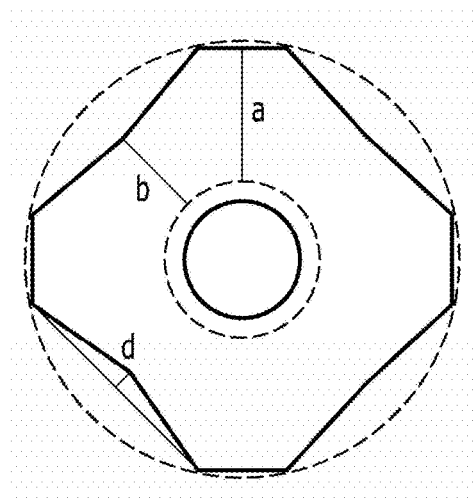
FIG. 1 is a schematic view showing a shape of a semi-conductor nanocrystal particle according to an embodiment.

Advantages and properties of this disclosure, and a method for achieving the same, will become evident referring to the following exemplary embodiments together with the drawings attached hereto. However, the embodiments should not be construed as being limited to the embodiments set forth herein.

If not defined otherwise, all terms (including technical and scientific terms) in the specification may be defined as they are commonly understood by one skilled in the art. The terms defined in a generally-used dictionary may not be interpreted ideally or exaggeratedly unless clearly defined as such. In addition, unless explicitly described to the contrary, the word "comprise" and variations such as "comprises" or "comprising," will be understood to imply the inclusion of stated elements but not the exclusion of any other elements.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

Further, the singular includes the plural unless mentioned otherwise.

As used herein, when a definition is not otherwise provided, the term "substituted" refers to a compound or a group or a moiety wherein at least one of hydrogen atoms thereof is substituted with a substituent selected from a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br or —I), a hydroxy group (—OH), a nitro group (—NO$_2$), a cyano group (—CN), an amino group (—NRR', wherein R and R' are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$)), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), a carboxylic acid group (—COOH) or a salt thereof (—C(=O)OM, wherein M is an organic or inorganic cation), a sulfonic acid group (—SO$_3$H) or a salt thereof (~SO$_3$M, wherein M is an organic or inorganic cation), a phosphoric acid group (~PO$_3$H$_2$) or a salt thereof (~PO$_3$MH or —PO$_3$M$_2$, wherein M is an organic or inorganic cation), and a combination thereof.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, the term "monovalent organic functional group" refers to a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, or a C2 to C30 heterocycloalkyl group.

As used herein, when a definition is not otherwise provided, the term "hetero" refers to one including 1 to 3 heteroatoms selected from N, O, S, Si, and P.

As used herein, the term "alkyl group" may refer to a group derived from a straight or branched chain saturated aliphatic hydrocarbon having the specified number of carbon atoms and having a valence of at least one.

As used herein, the term "alkoxy group" may refer to "alkyl-O—", wherein the term "alkyl" has the same meaning as described above.

As used herein, the term "alkenyl group" may refer to a straight or branched chain, monovalent hydrocarbon group having at least one carbon-carbon double bond.

As used herein, the term "alkynyl group" may refer to a straight or branched chain, monovalent hydrocarbon group having at least one carbon-carbon triple bond.

As used herein, the term "cycloalkyl group" may refer to a monovalent group having one or more saturated rings in which all ring members are carbon.

As used herein, the term "aryl", which is used alone or in combination, may refer to an aromatic hydrocarbon group containing at least one ring and having the specified number of carbon atoms. The term "aryl" may be construed as including a group with an aromatic ring fused to at least one cycloalkyl ring.

The term "heteroaryl group" may refer to an aryl group including carbon and 1 to 3 heteroatoms selected from the group consisting of N, O, S, and P as ring atoms.

The term "arylalkyl group" may refer to a substituted or unsubstituted aryl group covalently linked to an alkyl group that is linked to a compound.

The term "heteroarylalkyl group" may refer to a substituted or unsubstituted heteroaryl group covalently linked to an alkyl group that is linked to a compound.

As used herein, the term "alkylene group" may refer to a straight or branched saturated aliphatic hydrocarbon group having a valence of at least two, optionally substituted with one or more substituents.

As used herein, the term "alkenylene group" may refer to a straight or branched aliphatic hydrocarbon group having a valence of at least two, having at least one carbon-carbon double bond, optionally substituted with one or more substituents where indicated, provided that the valence of the alkenylene group is not exceeded.

As used herein, the term "cycloalkylene group" may refer to a cyclic hydrocarbon group having a valence of at least two, optionally substituted with one or more substituents where indicated, provided that the valence of the cycloalkylene group is not exceeded.

As used herein, the term "arylene group" may refer to a functional group having a valence of at least two obtained by removal of at least two hydrogens in an aromatic ring, optionally substituted with one or more substituents where indicated, provided that the valence of the arylene group is not exceeded.

As used herein, the term "heteroarylene group" may refer to a functional group having a valence of at least two obtained by removal of two hydrogens in an aromatic ring, containing one to three heteroatoms selected from the group consisting of N, O, S, Si, and P as ring-forming elements, optionally substituted with one or more substituents where indicated, provided that the valence of the heteroarylene group is not exceeded.

As used herein, the term "aliphatic organic group" refers to a C1 to C30 linear or branched alkyl group, C2 to C30 linear or branched alkenyl group, and/or C2 to C30 linear or branched alkynyl group, the term "aromatic organic group" refers to a C6 to C30 aryl group or a C2 to C30 heteroaryl group, and the term "alicyclic organic group" refers to a C3 to C30 cycloalkyl group, a C3 to C30 cycloalkenyl group and a C3 to C30 cycloalkynyl group.

As used herein, the term "(meth)acrylate" refers to acrylate and/or methacrylate.

As used herein, the term "hydrophobic moiety" refers to a moiety that causes a given compound including the same to show agglomeration in an aqueous solution and to have a tendency to repel water. For example, the hydrophobic moiety may include an aliphatic hydrocarbon group having a carbon number of greater than or equal to 2 (alkyl, alkenyl, alkynyl, etc.), an aromatic hydrocarbon group having a carbon number of greater than or equal to 6 (phenyl, naphthyl, aralkyl group, etc.), or an alicyclic hydrocarbon group having a carbon number of greater than or equal to 5 (cyclohexyl, norbornene, etc.). The hydrophobic moiety substantially lacks an ability to make a hydrogen bond with an ambient medium and is not substantially mixed with the medium as its polarity is not matched with that of the medium.

As used herein, the term "group" refers to a group of Periodic Table.

As used herein, "Group II" refers to Group IIA and Group IIB, and examples of Group II metal may be Cd, Zn, Hg, and Mg, but are not limited thereto.

As used herein, "Group III" refers to Group IIIA and Group IIIB, and examples of Group III metal may be Al, In, Ga, and Tl, but are not limited thereto.

As used herein, "Group IV" refers to Group IVA and Group IVB, and examples of a Group IV metal may be Si, Ge, and Sn, but are not limited thereto. As used herein, the term "metal" may include a semi-metal such as Si.

As used herein, "Group I" refers to Group IA and Group IB, and examples may include Li, Na, K, Ru, and Cs, but are not limited thereto.

As used herein, "Group V" refers to Group VA, and examples may include N, P, As, Sb, and Bi, but are not limited thereto.

As used herein, "Group VI" refers to Group VIA, and examples may include S, Se, and Te, but are not limited thereto.

As used herein, the term "(photo-) conversion rate" may refer to a ratio of emitted light with respect to incident light. In some embodiments, the photo conversion rate may be a ratio of emitted light amount of the quantum dot polymer composite to the absorbed light amount thereof from the excitation light (e.g., blue light). A total amount of the excitation light (e.g., a total amount of the blue light, B) may be obtained by integrating a photoluminescent spectrum of the excitation light. A PL spectrum of the quantum dot polymer composite is obtained and from the PL spectrum thus obtained, an amount of the blue light (B') and an amount of the light (A) that is emitted from the quantum dot polymer composite and has a green and/or red wavelength range are measured, respectively. Then, the photo-conversion rate is calculated by the following equation:

$$A/(B-B')\times 100 = \text{light conversion rate (\%)}.$$

As used herein, the term "dispersion" refers to a dispersion wherein a dispersed phase is a solid and a continuous phase includes a liquid. For example, the term "dispersion" may refer to a colloidal dispersion wherein the dissolved or dispersed phase has a dimension of about 1 nm to about 1 micrometer (μm).

Hereinafter, the term "binder" or "carboxylic acid group-containing binder" refers to the "carboxylic acid group-containing polymer."

Quantum dots are nano-sized particles, and photoluminescence properties and stability of the quantum dots may be easily affected by an external environment. To address the stability issue, quantum dots are dispersed in a solid state medium (e.g., a polymer matrix) to form a quantum dot-polymer composite. This composite may be applied to various electronic devices such as displays and illuminating devices. Recently, research efforts on patterning the quantum dot polymer composite have also been actively undertaken. However, after conversion to a quantum dot-polymer composite or a pattern thereof, the original photoluminescence properties of the quantum dots may be substantially deteriorated. Accordingly, there is still a need to develop a technology capable of producing the quantum dot-polymer composite or patterning the same without deterioration of the original properties of the quantum dots.

According to an embodiment, a quantum dot-polymer composite includes a polymer matrix and a quantum dot dispersed in the polymer matrix.

The quantum dot has a core-shell structure, the core includes a first semiconductor material, and the shell disposed on the core includes a second semiconductor material. The quantum dot does not include cadmium. The shell has at least two branches and at least one valley portion connecting the at least two branches, and the first semiconductor material is different from the second semiconductor material. In an embodiment, a column-shaped nanorod (i.e., cross-sectional surface of two branches forms a straight line) is excluded from the particle.

Most of the semiconductor nanocrystals having satisfactory properties include cadmium (Cd). As cadmium is one of the elements posing serious health and environmental threats, it is desirable to develop a cadmium-free semiconductor nanocrystal having improved light emitting properties. Group III-V compound semiconductor nanocrystals may be classified into a cadmium-free semiconductor nanocrystals, but the precursor used in their synthesis process is sensitive to oxidation and its activity tends to be poor in comparison with the cadmium-containing semiconductor nanocrystal (e.g., CdSe quantum dots), which makes the control of the synthetic reaction difficult. As Group III-V semiconductor nanocrystal, InP/ZnS core-shell semiconductor nanocrystals are one of the most researched quantum dots. However, the InP semiconductor nanocrystal has a lower level of light emitting properties than those of the conventional Cd quantum dot. Given that a desired particle size is 2-5 nanometers (nm), the synthesis of such a semiconductor nanocrystal is not easy.

In the quantum dot-polymer composite according to an embodiment, the quantum dot may have improved luminous efficiency and stability (e.g., thermal stability) by the structure (i.e., including at least two branches and at least one valley portion connecting the at least two branches) while it does not include cadmium.

A shell may effectively provide passivation for a surface of a core in the core-sell semiconductor nanocrystal particle to increase the luminous efficiency and to enhance the stability of the particle. For example, as the shell grows, the optical properties (e.g., light emitting wavelength, luminous efficiency, life-span or the like) of the core may be changed. The shell may act as a physical barrier to ensure the stability of the core, which is susceptible to the surrounding atmosphere. Furthermore, the shell provides passivation for the trap of the core surface, which promotes the enhancement in the luminous efficiency.

While the cadmium core-shell semiconductor nanocrystal may provide a high luminous efficiency, it is still difficult for the cadmium-free core-shell semiconductor nanocrystal to provide improved luminous efficiency as explained above. In the case of the Cd-free (e.g., indium) semiconductor nanocrystal, the core is passivated by a thin shell, generally, having a thickness of less than about 1 nanometer (nm). However, in the case of the indium core-shell semiconductor nanocrystal particles, such a thickness of the shell may be insufficient to passivate the core. Thus, the luminous efficiency and the stability thereof are inferior to the cadmium semiconductor nanocrystals.

Meanwhile, when the shell having the composition different from the core is grown to have a predetermined thickness (e.g., greater than or equal to about 1 nm), a branch may begin to form on a surface having a high surface energy in such a direction that lattice strain decreases. Thus, once the shell has a thickness of greater than or equal to a predetermined level, spherical growth may not occur. In addition, it is believed that the factors such as the lattice mismatch between the core and the shell, the crystalline face mismatch between the core and the shell, and the strain in a large curvature radius may preclude the spherical growth of the shell. In this case, it may be difficult for the core surface to obtain sufficient passivation, in particular, at its face other than that of a branch growing direction. This phenomenon may become more problematic for core-shell structured nanocrystals wherein the crystallographic surface of the core is different from that of the shell at the interface therebetween. For example, when a wurtzeit branch is growing on the core surface having a zinc blend structure, it is difficult to provide a valley portion connecting the branches, and the core face present between branches may be insufficiently passivated. In the case where the shell thickness increases under such circumstances, the light emitting properties such as a quantum efficiency of the semiconductor nanocrystal particle may decrease despite the increased shell thickness. Even when the spherical growth of the shell occurs, the indium semiconductor nanocrystal particle may have lower efficiency once the thickness of the shell reaches a predetermined value (e.g., of greater than or equal to about 1 nm).

On the contrary, in the semiconductor nanocrystal particle according to an embodiment, the shell includes at least 2 (e.g., 3, 4, 5, 6, 7, or even 8 or more) branches and a valley portion connecting the branches as well. In the quantum dot according to an embodiment, the branches (i.e., anisotropic or unsymmetrical structure) are formed due to the increased level of lattice mismatch between the core and the shell and the increased differences of the surface energies therebetween when the shell grows to have a predetermined thickness (e.g., greater than or equal to 3 mono layer, greater than or equal to 4 monolayer, or greater than or equal to about 1 nm). But at the same time, a portion of the shell between the branches (i.e., the valley portion) may also grow to connect the branches. This makes it possible for the shell to effectively cover the surface of the core. Without wishing to be bound by any theory, it is understood that when the core and the shell have the same crystalline structure (e.g., zinc blend or wurtzeit) and the composition of the shell is varied to adjust the lattice mismatch at the interface between the core and the shell, the valley portion may grow together with the branch. For example, it is believed that the valley portion may grow together with the branch when the shell composition is adjusted in order to decrease the lattice mismatch at the interface of the core and the shell at the time when the branch is formed, and thereafter, to control (e.g., increase) the lattice mismatch, if desired.

Thus, in the quantum dot according to an embodiment, the shell may surround the entire surface of the core. The structure is described in detail, with reference to FIG. 1 and FIG. 2, showing a structure according to the non-limiting embodiments.

As shown in FIG. 1, the quantum dot according to the non-limiting embodiment includes a core; and 4 branches and a valley portion connecting the branches. Although the core has a spherical shape in FIG. 1, the core may have any shape in another embodiment. For example, the core may be tetrahedron, truncated tetrahedron, octahedron, truncated octahedron, or polyhedron.

Figure 2:
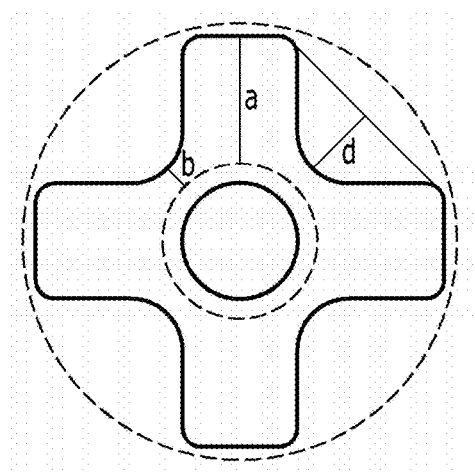
FIG. 2 is a schematic view showing a shape of a semi-conductor nanocrystal particle according to another embodiment.

In FIGS. 1 and 2, a is a length of branch; b is a thickness of valley portion (i.e., symmetrically grown shell). In the quantum dot, the depth (d) of at least one valley portion may be greater than 0. As used herein, the term "a depth of the valley portion" refers to a length extending from a straight line connecting two adjacent branches to the lowest point of the given valley portion (e.g., "d" in FIGS. 1 and 2)

As mentioned above, in the semiconductor nanocrystal according to an embodiment, the core and the shell may have the same crystal structure (e.g., zinc blend structure or wurtzeit structure) at the interface therebetween. The branch may have a different composition depending on the length, i.e., the composition of the branch may be a function of the length. For example, the shell has two or more elements or, for example, three or more elements, and as far away from the core, the amount of at least one element out of the elements may be increased. In non-limiting examples, the shell has an ABC (e.g., ZnSeS) composition, and as far away from the core, the amount of A, B, or C (e.g., the amount of sulfur (S)) may be increased.

The quantum dot according to an embodiment may have a shell thickness of greater than or equal to about 1.7 nm, for example, greater than about 2.0 nm, or greater than or equal to about 2.5 nm. While not wishing to be bound by theory, it is understood that the quantum dot having a shell thickness within the aforementioned range may maintain improved luminous efficiency, even though it undergoes a heat treatment in a process of producing a quantum dot-polymer composite (e.g., a quantum dot-polymer composite pattern).

The first semiconductor material may include a Group II-VI compound, a Group III-V compound, a Group IV-VI compound, a Group IV compound, a Group I-III-VI compound, or a combination thereof. Likewise, the second semiconductor material is different from the first semiconductor material and may include a Group II-VI compound, a Group III-V compound, a Group IV-VI compound, a Group IV compound, a Group I-III-VI compound, a Group I-III-VI compound, a Group I—II-IV-VI compound, or a combination thereof.

The Group II-VI compound may be selected from a binary element compound selected from ZnS, ZnSe, ZnTe, ZnO, HgS, HgSe, HgTe, MgSe, MgS, and a combination thereof; a ternary element compound selected from ZnSeS, ZnSeTe, ZnSTe, HgSeS, HgSeTe, HgSTe, HgZnS, HgZnSe, HgZnTe, MgZnSe, MgZnS, and a combination thereof; and a quaternary element compound selected from HgZnTeS, HgZnSeS, HgZnSeTe, HgZnSTe, and a combination thereof. The Group II-VI compound may further include a Group III metal.

The Group III-V compound may be selected from a binary element compound selected from GaN, GaP, GaAs, GaSb, AlN, AlP, AlAs, AlSb, InN, InP, InAs, InSb, and a combination thereof; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and a quaternary element compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof. The Group III-V compound may further include a Group II metal (InZnP).

The Group IV-VI compound may be selected from a binary element compound selected from SnS, SnSe, SnTe, PbS, PbSe, PbTe, and a combination thereof; a ternary element compound selected from SnSeS, SnSeTe, SnSTe, PbSeS, PbSeTe, PbSTe, SnPbS, SnPbSe, SnPbTe, and a combination thereof; and a quaternary element compound selected from SnPbSSe, SnPbSeTe, SnPbSTe, and a combination thereof.

The Group I-III-VI compound may be selected from CuInSe$_2$, CuInS$_2$, CuInGaSe, CuInGaS, and a combination thereof.

The Group II-III-VI compound may be selected from ZnGaS, ZnAlS, ZnInS, ZnGaSe, ZnAlSe, ZnInSe, ZnGaTe, ZnAlTe, ZnInTe, ZnGaO, ZnAlO, ZnInO, HgGaS, HgAlS, HgInS, HgGaSe, HgAlSe, HgInSe, HgGaTe, HgAlTe, HgInTe, MgGaS, MgAlS, MgInS, MgGaSe, MgAlSe, MgInSe, and a combination thereof.

The Group I-II-IV-IV compound may be selected from CuZnSnSe, CuZnSnS, and a combination thereof.

The Group IV element or compound may be selected from a singular element material selected from Si, Ge, and a combination thereof; and a binary element compound selected from SiC, SiGe, and a combination thereof.

The core may include a Group III-V compound (e.g., InP), and the shell may include a Group II-VI compound (e.g., ZnS or ZnSeS). The core may include indium, and the shell may include at least three elements (ternary element compound or quaternary element compound). The core may further include Zn. For example, the core may be a Group III-V compound including Zn (e.g., InPZn or InP(Zn)). Herein, the InP(Zn) means presence of Zn on the surface.

The quantum dot having the aforementioned structure and the composition may be prepared by a wet chemical method. Conditions for the wet chemical method can be selected appropriately. In the wet chemical method, the composition and shape of the core, the types and amount of for the shell precursors, and the order of the injection, the temperature, or the like are controlled to provide the aforementioned structure.

According to a non-limiting embodiment, in the shell growth after the core synthesis, a solution including shell precursors may be by step added to a reaction system to change the shell composition. As a non-limiting example, when a ternary element (ABC) compound forms a shell, it is possible to control the inputting order of the A element precursor (e.g., metal element), the B element precursor (e.g., first non-metal element), and the C element precursor (e.g., second non-metal element) into a solution, the content, and the reaction time. For example, a core is added to the A element precursor solution, and then, the B element precursor solution is added thereto, and the reaction proceeds for a predetermined time. Subsequently, at least one of the C element precursor solution and the B element precursor solution may be placed into the reaction system, either separately or in the form of a mixture, thus making the reaction to further proceed. At this time, by adjusting the inputting time of the C element precursor solution and the B element precursor solution and the ratio between the precursors in the reaction system, it becomes possible to control the lattice mismatch at the interface of the core and shell in the appropriate time point, and thereby the valley portion may grow together with the branch, so as to provide a semiconductor nanocrystal having the aforementioned structure.

At this time, by adjusting the inputting time of C element precursor solution and the B element precursor solution and the ratio between the precursors in the reaction system, it may control the lattice mismatch at the interface of core and shell at an appropriate time. In addition, the reaction temperature and the types of the C element precursor may be changed to control the growing energy on the surface. Thereby, the valley portion may be grown together with the branch, and thus a quantum dot having the aforementioned structure may be obtained.

The reaction system may further include an organic solvent and an organic ligand, and the specific types thereof are not particularly limited. For example, the organic solvent may include C6 to C22 primary alkylamines such as hexadecylamine, C6 to C22 secondary alkylamines such as dioctylamine, C6 to C40 tertiary alkylamine such as trioctylamine, nitrogen-containing heterocyclic compounds such as pyridine, C6 to C40 olefin such as octadecene, C6 to C40 aliphatic hydrocarbons such as hexadecane, octadecane, and squalene, C6 to C30 alkyl group-substituted aromatic hydrocarbons such as phenyldodecane, phenyltetradecane, and phenyl hexadecane, C6 to C22 alkyl group-substituted phosphines such as trioctylphosphine, C6 to C22 alkyl group-substituted phosphine oxides such as trioctylphosphine oxide, C12 to C22 aromatic ethers such as phenyl ether, and benzyl ether, or a combination thereof.

The organic ligand may coordinate to the surface of the obtained nanocrystal and may affect the light emitting and electric properties as well as may well disperse the nanocrystal in the solution phase. The ligand compound may be selected from RCOOH, $RNH_2$, $R_2NH$, $R_3N$, RSH, $R_3PO$, $R_3P$, ROH, RCOOR' and RCOOCOR' (wherein, R and R' are each independently a C1-C24 aliphatic hydrocarbon group, for example, an alkyl or alkenyl, or a C5-C24 aromatic hydrocarbon group, for example an aryl group). The ligand may be used alone or in a combination (such as a mixture) of two or more compounds. The organic ligand may have a hydrophobic moiety.

Examples of the organic ligand compound may be methane thiol, ethane thiol, propane thiol, butane thiol, pentane thiol, hexane thiol, octane thiol, dodecane thiol, hexadecane thiol, octadecane thiol, benzyl thiol; methane amine, ethane amine, propane amine, butane amine, pentane amine, hexane amine, octane amine, dodecane amine, hexadecyl amine, oleyl amine, octadecyl amine, dimethyl amine, diethyl amine, dipropyl amine; methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, palmitic acid, stearic acid; phosphine such as methyl phosphine, ethyl phosphine, propyl phosphine, butyl phosphine, pentyl phosphine, tributylphosphine, and trioctylphosphine; a phosphine compound or an oxide compound thereof such as methyl phosphine oxide, ethyl phosphine oxide, propyl phosphine oxide, butyl phosphine oxide, and trioctylphosphine oxide; diphenyl phosphine, triphenyl phosphine compound or an oxide compound thereof; phosphonic acid, and the like, but is not limited thereto. The organic ligand compound may be used alone or in a mixture of two or more compounds.

The reaction conditions such as a reaction temperature and a reaction time are not particularly limited, and may be selected appropriately. In non-limiting embodiments, the solvent and, optionally, the ligand compound is heated (and/or subjected to evacuation) at a predetermined temperature (e.g., at a temperature of greater than or equal to about 100° C.) under vacuum and heated again at a predetermined temperature (e.g., at a temperature of greater than or equal to 100° C.) after purging the inert gas to provide the inert gas atmosphere. Subsequently, the core is input, and the shell precursor is sequentially or simultaneously input and reacted by heating at a predetermined reaction temperature (e.g., a temperature of greater than or equal to about 270° C.). The shell precursor may be sequentially input for a reaction time as a mixture having the different ratio.

A precursor including a metal element (which is free of cadmium) includes a Group II metal, a Group III metal, or a Group IV metal, and may be a metal powder, an alkylated metal compound, a metal alkoxide, a metal carboxylate, a metal nitrate, a metal perchlorate, a metal sulfate, a metal acetylacetonate, a metal halide, a metal cyanide, a metal hydroxide, a metal oxide, a metal peroxide, or a combination thereof.

Examples of the precursor including a metal element may include one or more selected from dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, trimethyl indium, indium acetate, indium hydroxide, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, dimethyl magnesium, dibutyl magnesium, magnesium ethoxide, magnesium acetylacetonate, magnesium carboxylate, and magnesium halide, but are not limited thereto.

A precursor including a non-metal element may include one or more selected from hexane thiol, octane thiol, decane thiol, dodecane thiol, hexadecane thiol, mercapto propyl silane, sulfur-trioctylphosphine (S-TOP), sulfur-tributylphosphine (S-TBP), sulfur-triphenylphosphine (S-TPP), sulfur-trioctylamine (S-TOA), bistrimethylsilyl sulfur, ammonium sulfide, sodium sulfide, tellurium-tributylphosphine (Te-TBP), tellurium-triphenylphosphine (Te-TPP), tris(trimethylsilyl) phosphine, tris(dimethylamino) phosphine, triethylphosphine, tributylphosphine, trioctylphosphine, triphenylphosphine, tricyclohexylphosphine, arsenic oxide, arsenic chloride, arsenic sulfate, arsenic bromide, arsenic iodide, tris(trimethylsilyl)arsenic, nitric oxide, nitric acid, and ammonium nitrate, but are not limited thereto.

After completing reaction, when a non-solvent is added to the reaction product, the nanocrystal coordinated to the ligand compound may be separated. The non-solvent may be a polar solvent, which can be mixed with the solvent used in the reaction, but which is not capable of dispersing the nanocrystal. The non-solvent may be selected in accordance with a solvent used in the reaction, and may be, for example, acetone, ethanol, butanol, iso-propanol, ethanediol, water, tetrahydrofuran (THF), dimethylsulfoxide (DMSO), diethyl ether, formaldehyde, acetaldehyde, ethylene glycol, a solvent having a similar solubility parameter to the foregoing solvents, or a combination thereof. The separation may use a centrifugation, a precipitation, a chromatography, or a distillation. The separated nanocrystal may be added in a rinsing solvent to be cleaned, if needed. The rinsing solvent is not particularly limited but may be a solvent having the similar solubility parameter to the ligand, and the examples thereof may include hexane, heptane, octane, chloroform, toluene, benzene or the like.

The quantum dot-polymer composite may be patterned to have at least two color section, for example, a first color section, a second color section, a third color section, and the like. The quantum dot of the first color section may emit light (e.g., red light) of a peak emission wavelength of about 620 nm to about 650 nm, and the quantum dot of the second color section may emit light (e.g., green light) of a peak emission wavelength of about 520 nm to about 550 nm.

A liquid crystal display (LCD) is a display device providing an image when polarized light passing a liquid crystal passes an absorption-type color filter. The liquid crystal display (LCD) has a drawback of deteriorating luminance due to a narrow viewing angle and the light transmittance (e.g., 33%) of the absorption-type color filter. The absorption-type color filter including an absorption-type pigment/dye may be replaced by a photoluminescent-type color filter including a light emitting particle (i.e., quantum dot) to realize a wide viewing angle and improved luminance of the liquid crystal display (LCD). Since the quantum dot has a sharp light emitting spectrum (that is, a narrow full width at half maximum (FWHM)), the photoluminescent type color filter may provide improved color reproducibility.

In order to form the photoluminescent type color filter by using a quantum dot-polymer composite, the composite needs to be patterned. In addition, the quantum dot-polymer composite pattern may be required to have a high photoconversion rate in order to realize a display device having increased luminance. However, since a conventional patterning using a photoresist (e.g., a photocurable process, a prebaking process, a post-baking process, and the like) provides the quantum dot with a disadvantageous environment, photoluminescence properties of the quantum dot-polymer composite pattern may be remarkably deteriorated.

According to an embodiment, a quantum dot polymer composite includes a quantum dot having the aforementioned structure, and thus, may maintain excellent photoluminescence properties in the patterning process using a photoresist.

In the quantum dot-polymer composite according to an embodiment, a content of the quantum dot including the organic ligand may be greater than or equal to about 1 wt %, for example, greater than or equal to about 5 wt %, or greater than or equal to about 10 wt %, and less than or equal to about 40 wt %, for example less than or equal to about 35 wt %, less than or equal to about 30 wt %, or less than or equal to about 25 wt %, based on the total weight of the composite.

In the quantum dot-polymer composite, the polymer matrix may include a carboxylic acid group (—COOH)-containing binder. As a quantum dot has poor compatibility with a photoresist of a conventional art, quantum dots may be agglomerated when the quantum dot is simply mixed with a photoresist. In order to apply a patterned quantum dot-polymer composite to a color filter, a large amount of quantum dots is required to be included in the composite. However, patterning is not easy when the quantum dots are poorly (i.e., non-uniformly) dispersed.

Surprisingly, dispersing the quantum dots in a solution including the binder to prepare a dispersion and mixing the dispersion with the remaining components makes it possible to disperse (even a relatively large amount of) the quantum dots well in an alkali-developable photoresist. Therefore, in an embodiment, a composition includes:

a quantum dot dispersion;
a photopolymerizable monomer having a carbon-carbon double bond; and
a photoinitiator,
wherein the quantum dot dispersion includes a carboxylic acid group (—COOH)-containing binder and (e.g., a plurality of) the aforementioned quantum dots dispersed in the carboxylic acid group containing binder.

The carboxylic acid group-containing binder may have an acid value of greater than or equal to about 50 milligrams of potassium hydroxide per gram of the binder (mg KOH/g). For example, the carboxylic acid group-containing binder may have an acid value of greater than or equal to about 60 mg KOH/g, greater than or equal to about 70 mg KOH/g, greater than or equal to about 80 mg KOH/g, greater than or equal to about 90 mg KOH/g, greater than or equal to about 100 mg KOH/g, greater than or equal to about 110 mg KOH/g, or greater than or equal to about 120 mg KOH/g. The carboxylic acid group-containing binder may have an acid value of less than or equal to about 200 mg KOH/g, for example, less than or equal to about 190 mg KOH/g, less than or equal to about 180 mg KOH/g, or less than or equal to about 160 mg KOH/g, but is not limited thereto. The quantum dot is mixed in a binder-containing solution having an acid value within the ranges and forms quantum dot-binder dispersion. The formed quantum dot-binder dispersion has improved compatibility with components except a photoresist (e.g., a photopolymerizable monomer, a photoinitiator, a solvent, and the like), and the quantum dots are dispersed in a resulting composition (i.e., photoresist composition) to be patternable. In an embodiment, the carboxylic acid group-containing binder may have an acid value of about 100 mg KOH/g to about 200 mg KOH/g.

The carboxylic acid group-containing binder may be a copolymer of a monomer combination of a first monomer including a carboxylic acid group and a carbon-carbon double bond and a second monomer including a carbon-carbon double bond and a hydrophobic moiety and not including a carboxylic acid group, and the plurality of quantum dots may be dispersed (e.g., separated from each other) in the carboxyl binder.

Specific examples of the first monomer may include acrylic acid, methacrylic acid, maleic acid, itaconic acid, fumaric acid, 3-butanoic acid, carbonic acid vinyl ester compounds such as vinyl acetate, and vinyl benzoate, but are not limited thereto. The first monomer may be one or more compounds.

Specific examples of the second monomer may be alkenyl aromatic compounds such as styrene, α-methyl styrene, vinyl toluene, or vinyl benzyl methyl ether; unsaturated carbonic acid ester compounds such as methyl acrylate, methyl methacrylate, ethyl acrylate, ethyl methacrylate, butyl acrylate, butyl methacrylate, benzyl acrylate, benzyl methacrylate, cyclohexyl acrylate, cyclohexyl methacrylate, phenyl acrylate, or phenyl methacrylate; unsaturated carbonic acid amino alkyl ester compounds such as 2-amino ethyl acrylate, 2-amino ethyl methacrylate, 2-dimethyl amino ethyl acrylate, N-phenylmaleimide, N-benzylmaleimide, N-alkylmaleimide, or 2-dimethyl amino ethyl methacrylate; unsaturated carbonic acid glycidyl ester compounds such as glycidyl acrylate, or glycidyl methacrylate; vinyl cyanide compounds such as acrylo nitrile, or methacrylo nitrile; acryl amide, unsaturated amide compounds such as methacryl amide, but are not limited thereto. The second monomer may be one compound or a combination of two or more compounds.

The carboxylic acid group-containing binder may be a copolymer of a monomer mixture that further includes a third monomer including a carbon-carbon double bond and a hydrophilic moiety and not including a carboxylic acid group.

Specific examples of the third monomer may include 2-hydroxy ethyl acrylate, 2-hydroxy ethyl methacrylate, 2-hydroxy butyl acrylate, 2-hydroxy butyl methacrylate, 2-amino ethyl acrylate, and 2-amino ethyl methacrylate, but are not limited thereto. The third monomer may be one compound or a combination of two or more compounds.

In the carboxylic acid group-containing binder, a content of the first repeating unit may be greater than or equal to about 10 mole percent (mol %), for example, greater than or equal to about 15 mol %, greater than or equal to about 25 mol %, or greater than or equal to about 35 mol %. In the carboxylic acid group-containing binder, the content of the first repeating unit may be less than or equal to about 90 mol %, for example, less than or equal to about 80 mol %, less than or equal to about 70 mol %, less than or equal to about 60 mol %, less than or equal to about 50 mol %, less than or equal to about 40 mol %, less than or equal to about 35 mol %, or less than or equal to about 25 mol %.

In the carboxylic acid group-containing binder, a content of the second repeating unit may be greater than or equal to about 10 mol %, for example, greater than or equal to about 15 mol %, greater than or equal to about 25 mol %, or greater than or equal to about 35 mol %. In the carboxylic acid group-containing binder, the content of the second repeating unit may be less than or equal to about 90 mol %, less than or equal to about for example, 80 mol %, less than or equal to about 70 mol %, less than or equal to about 60 mol %, less than or equal to about 50 mol %, less than or equal to about 40 mol %, less than or equal to about 35 mol %, less than or equal to about or 25 mol %.

In the carboxylic acid group-containing binder, a content of the third repeating unit may be greater than or equal to about 1 mol %, for example, may be greater than or equal to about 5 mol %, may be greater than or equal to about 10 mol %, or may be greater than or equal to about 15 mol %, if present. In the carboxylic acid group-containing binder, the content of the third repeating unit may be less than or equal to about 20 mol %, for example less than or equal to about 15 mol %, less than or equal to about 10 mol %.

The carboxylic acid group-containing binder may be a copolymer of (meth)acrylic acid; and at least one second monomer may be selected from arylalkyl(meth)acrylate, hydroxyalkyl (meth)acrylate, and styrene. For example, the carboxylic acid group-containing binder may be a methacrylic acid/methyl methacrylate copolymer, a methacrylic acid/benzyl methacrylate copolymer, a methacrylic acid/benzyl methacrylate/styrene copolymer, a methacrylic acid/benzyl methacrylate/2-hydroxy ethyl methacrylate copolymer, a methacrylic acid/benzyl methacrylate/styrene/2-hydroxy ethyl methacrylate copolymer.

In another embodiment, the carboxylic acid group-containing binder may include a multiple aromatic ring-containing polymer (also known as, a cardo-based resin). The multiple aromatic ring-containing polymer has a backbone structure where two aromatic rings are bound to a quaternary carbon atom that is a constituent atom of another cyclic moiety incorporated in the main chain, wherein the main chain includes a carboxylic acid group (—COOH) (e.g., bound to the main chain). The cardo based binder may have a relatively low an acid value (e.g., of greater than or equal to about 50 mg KOH/g) in order to disperse quantum dots well, but the acid value may vary depending on a skeleton structure of the multiple aromatic ring-containing polymer (e.g., a chemical structure of a main chain or a side chain of the binder). For example, the carboxylic acid group-containing binder may have an acid value of greater than or equal to about 55 mg KOH/g, greater than or equal to about 60 mg KOH/g, greater than or equal to about 70 mg KOH/g, greater than or equal to about 80 mg KOH/g, greater than or equal to about 90 mg KOH/g, greater than or equal to about 100 mg KOH/g, or greater than or equal to about 110 mg KOH/g. The carboxylic acid group-containing binder may have an acid value of, for example, less than or equal to about 200 mg KOH/g, for example, less than or equal to about 190 mg KOH/g, less than or equal to about 180 mg KOH/g, or less than or equal to about 170 mg KOH/g, but it is not limited thereto. The quantum dots are mixed with a solution of a binder having the acid value within the aforementioned range to provide a quantum dot-binder dispersion; the obtained quantum dot-binder dispersion may have the improved compatibility with the other components for the photoresist (e.g., a photopolymerizable monomer, a photoinitiator, a solvent, etc.) and thereby the quantum dots may be dispersed in the final composition (i.e., photoresist composition) to form a pattern. In an embodiment, the carboxylic acid group-containing binder may have an acid value of about 50 mg KOH/g to about 150 mg KOH/g. The aforementioned range may provide effects of increasing the stability and compatibility of the dispersion.

In the multiple aromatic ring-containing polymer, the backbone structure may be represented by Chemical Formula A:

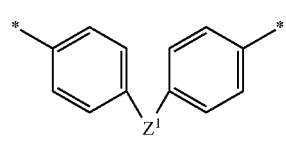

Chemical Formula A wherein, one * is a binding position with an adjacent atom of the main chain of the binder, $Z^1$ is one of linking moieties represented by Chemical Formulae A-1 to A-6, and in Chemical Formulae A-1 to A-6, and the other * is a linking position with an aromatic moiety:

Chemical Formula A-1

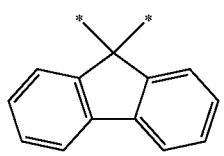

wherein * indicates a point of binding to an adjacent atom,

Chemical Formula A-2

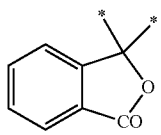

wherein * indicates a point of connection to an adjacent atom,

Chemical Formula A-3

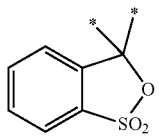

wherein * indicates a point of connection to an adjacent atom,

Chemical Formula A-4

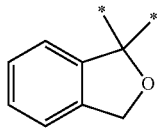

wherein * indicates a point of connection to an adjacent atom,

Chemical Formula A-5

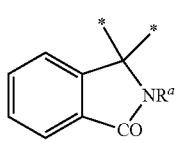

wherein, $R^a$ is a hydrogen atom, an ethyl group, $-C_2H_4Cl$, $-C_2H_4OH$, $-CH_2CH=CH_2$, or a phenyl group, and

* indicates a point of connection to an adjacent atom,

Chemical Formula A-6

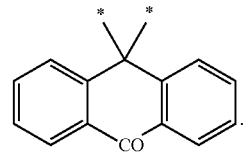

The carboxylic acid group-containing binder may include a repeating unit represented by Chemical Formula B:

Chemical Formula B

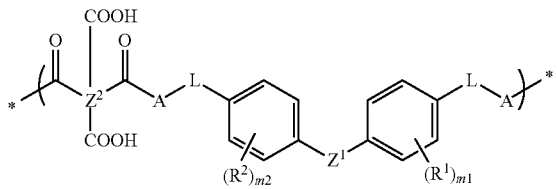

wherein, $Z^1$ is one of linking moieties represented by Chemical Formulae A-1 to A-6, L is a single bond, a C1 to C10 alkylene group, a C1 to C10 alkylene group having a substituent including a carbon-carbon double bond, a C1 to C10 oxy alkylene group, or a C1 to C10 oxyalkylene group having a substituent including a carbon-carbon double bond, A is $-NH-$, $-O-$, or a C1 to C10 alkylene, $Z^2$ is a C6 to C40 aromatic organic group, and

* indicates a point of connection to an adjacent atom.

In Chemical Formula B, $Z^2$ is one of Chemical Formula [B-1], Chemical Formula [B-2], and Chemical Formula [B-3]:

Chemical Formula B-1

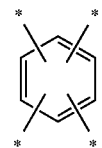

wherein, * is a binding position with an adjacent carbonyl carbon,

Chemical Formula B-2

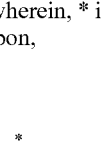

wherein, * is a binding position with an adjacent carbonyl carbon,

Chemical Formula B-3

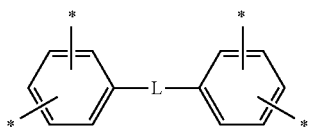

wherein,
* is a binding position with an adjacent carbonyl carbon,

L is a single bond, —O—, —S—, —C(=O)—, —CH(OH)—, —S(=O)$_2$—, —Si(CH$_3$)$_2$—, (CH$_2$)$_p$ (wherein, 1≤p≤10), (CF$_2$)$_q$ (wherein, 1≤q≤10), —CR$_2$— (wherein, R is independently, hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—.

The multiple aromatic ring-containing polymer may include a structural unit represented by Chemical Formula C:

Chemical Formula C

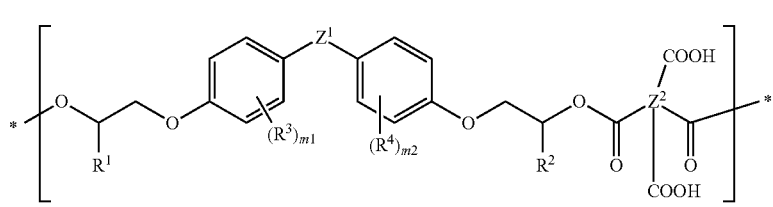

wherein,
R$^1$ and R$^2$ are independently a hydrogen atom or a substituted or unsubstituted (meth)acryloyloxyalkyl group,
R$^3$ and R$^4$ are independently a hydrogen atom, a halogen atom or a substituted or unsubstituted C1 to C20 alkyl group,
Z$^1$ is a moiety selected from linking moieties represented by Chemical Formulae A-1 to A-6,
Z$^2$ is an aromatic organic group, and is, for example the same as above,
m1 and m2 are independently an integer ranging from 0 to 4, and
* indicates a point of connection to an adjacent atom.

In an embodiment, the multiple aromatic ring-containing polymer may be an acid addition product of bisphenolfluorene epoxy acrylate. For example, the bisphenol fluorene epoxy acrylate may be obtained by reacting 4,4-(9-fluorenylidene)-diphenol with epichlorohydrin to obtain an epoxy compound having a fluorene moiety, reacting the epoxy compound with acrylic acid to obtain fluorenylepoxyacrylate having a hydroxy group, and reacting it with biphenyl dianhydride and/or phthalic anhydride. Such a reaction scheme is as follows.

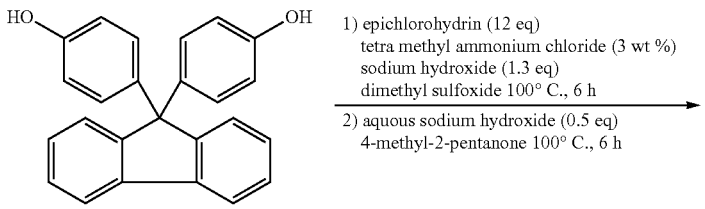
1) epichlorohydrin (12 eq)
    tetra methyl ammonium chloride (3 wt %)
    sodium hydroxide (1.3 eq)
    dimethyl sulfoxide 100° C., 6 h
2) aqueous sodium hydroxide (0.5 eq)
    4-methyl-2-pentanone 100° C., 6 h

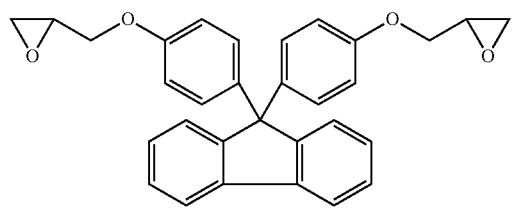

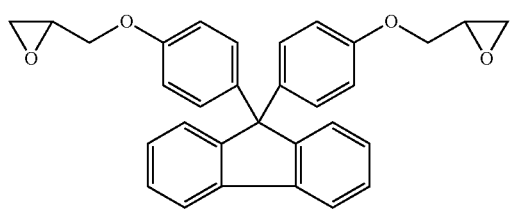

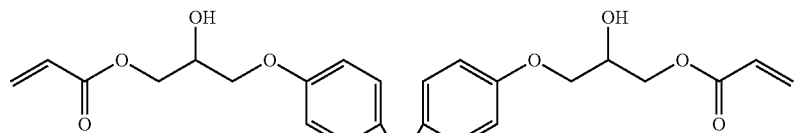

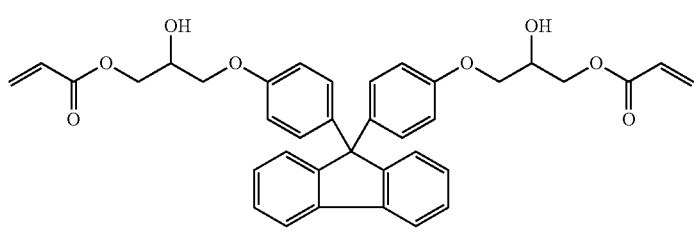

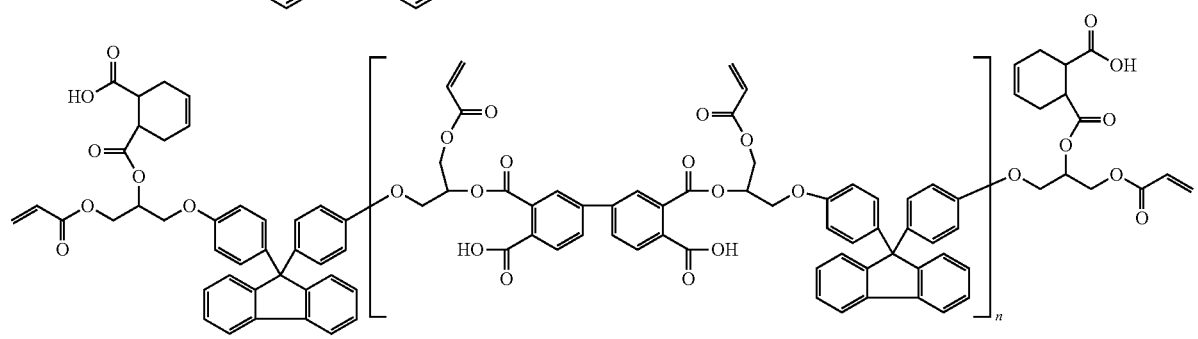

The multiple aromatic ring-containing polymer may include a functional group represented by Chemical Formula D at at least one terminal end of both terminal ends:

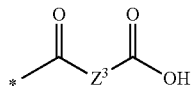

Chemical Formula D

In Chemical Formula 4, $Z^3$ is a moiety represented by one of Chemical Formulae D-1 to D-7, and

* indicates a point of connection to an adjacent atom:

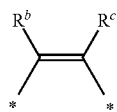

Chemical Formula D-1 wherein, $R^b$ and $R^c$ are independently a hydrogen atom, a substituted or unsubstituted C1 to C20 alkyl group, an ester group, or an ether group, and

* indicates a point of connection to an adjacent atom.

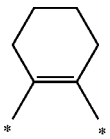

Chemical Formula D-2 wherein * indicates a point of connection to an adjacent atom,

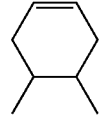

Chemical Formula D-3 wherein * indicates a point of connection to an adjacent atom,

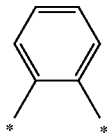

Chemical Formula D-4 wherein * indicates a point of connection to an adjacent atom,

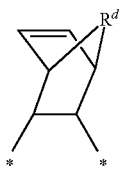

Chemical Formula D-5 wherein,
$R^d$ is O, S, NH, a substituted or unsubstituted C1 to C20 alkylene group, a C1 to C20 alkylamine group, or a C2 to C20 alkenylamine group, and
* indicates a point of connection to an adjacent atom.

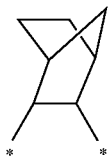

Chemical Formula D-6 wherein * indicates a point of connection to an adjacent atom,

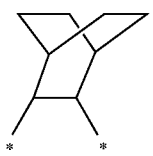

Chemical Formula D-7 wherein * indicates a point of connection to an adjacent atom.

The multiple aromatic ring-containing polymer may be synthesized by a known method or commercially available (e.g., Nippon Steel Corporation).

The multiple aromatic ring-containing polymer may include a moiety derived from reaction products of fluorene compounds selected from 9,9-bis(4-hydroxyphenyl)fluorene, 9,9-bis (4-aminophenyl)fluorene, 9,9-bis[4-(glycidyloxy)phenyl]fluorene, 9,9-bis[4-(2-hydroxyethoxy)phenyl]fluorene and to aromatic dianhydrides selected from 9,9-bis-(3,4-dicarboxyphenyl)fluorene dianhydrides, pyromellitic dianhydride (PDMA), biphenyltetracarboxylic dianhydrides (BPDA), benzophenol tetracarboxylic dianhydrides, and naphthalene tetracarboxylic dianhydrides, and desirable compounds capable of reacting with the fluorene compounds (e.g., aromatic acid dianhydride selected from pyromellitic dianhydride (PDMA), biphenyltetracarboxylic dianhydride (BPDA), benzophenol tetracarboxylic dianhydride, and naphthalene tetracarboxylic dianhydride, C2 to C30 diol compound, epichlorohydrin, etc.).

The fluorene compound, acid anhydride, and diol compounds are commercially available and condition for the reactions therebetween may be known.

The carboxylic acid group-containing binder may have a molecular weight of greater than or equal to about 1,000 grams per mole (g/mol), for example, greater than or equal to about 2,000 g/mol, greater than or equal to about 3,000 g/mol, or greater than or equal to about 5,000 g/mol. The carboxylic acid group-containing binder may have a molecular weight of less than or equal to about 100,000 g/mol, for example, less than or equal to about 50,000 g/mol. While not wishing to be bound by theory, it is understood that within the ranges, developability during patterning may be ensured.

In the composite, a content of the carboxylic acid group-containing binder may be greater than or equal to about 0.5 wt %, for example, greater than or equal to about 1 wt %, greater than or equal to about 5 wt %, greater than or equal to about 10 wt %, greater than or equal to about 15 wt %, or greater than or equal to about 20 wt % based on the total amount of the composite, but is not limited thereto. The content of the carboxylic acid group-containing binder may be less than or equal to about 59.5 wt %, less than or equal to about 40 wt %, or less than or equal to about 30 wt % based on the total amount of the composite. While not wishing to be bound by theory, it is understood that within the above ranges, an appropriate developability and processability during a post pattern forming process may be realized while ensuring dispersibility of quantum dots.

The polymer matrix may further include a radical polymerization product of a photopolymerizable acryl-based monomer, a radical polymerization product of the photopolymerizable acryl-based monomer and a reactive compound having at least two thiol groups and represented by Chemical Formula 2, or a combination thereof:

Chemical Formula 2 wherein, in Chemical Formula 2,
$R^1$ is hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; —$NH_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), $L_1$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein non-adjacent methylene (—CH$_2$—) of the substituted C1 to C30 alkylene group may be replaced by sulfonyl (—SO$_2$—), carbonyl (—CO—), ether (—O—), sulfide (—S—), sulfoxide (—SO—), ester (—C(=O)O—), amide (—C(=O)NR—) (wherein R is hydrogen or a C1 to C10 alkyl group) or a combination thereof, $Y_1$ is a single bond; a substituted or unsubstituted C1 to C30 alkylene group; a substituted or unsubstituted C2 to C30 alkenylene group; a substituted C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group) or a combination thereof, m is an integer of 1 or more, k1 is 0 or an integer of 1 or more, k2 is an integer of 1 or more, and a sum of m and k2 is an integer of 3 or more, provided that when $Y_1$ is not a single bond, m does not exceed the valence of $Y_1$, and provided that a sum of k1 and k2 does not exceed the valence of $L_1$.

The photopolymerizable acryl-based monomer may be a main monomer having 1 to 6 (meth)acrylate groups. If needed, the photopolymerizable acryl-based monomer may further include at least one of a first auxiliary monomer having 8 to 20 carbon-carbon double bonds and a second auxiliary monomer represented by Chemical Formula 1.

$$R^1O\text{-}(L_1)_m\text{-}L_3\text{-}A\text{-}L_4\text{-}(L_2)_n\text{-}OR^2 \qquad \text{Chemical Formula 1}$$

wherein,

A is a C1 to C40 aliphatic hydrocarbon group, a C6 to C40 aromatic hydrocarbon group, a moiety including at least two C6 to C40 aromatic hydrocarbon groups linked by a substituted or unsubstituted C1 to C10 alkylene, an ether, or a combination thereof, or an ether (—O—), $L_1$ and $L_2$ are independently the same or different, and are a C2 to C5 substituted or unsubstituted oxyalkylene, and m and n are an integer ranging from 0 to 20, provided that m and n are not simultaneously 0, $L_3$ and $L_4$ are independently the same or different, and are a single bond, —O—(CH$_2$)$_n$—CH(OH)—CH$_2$—, or —(CH$_2$)$_n$—CH(OH)—CH$_2$—, and $R^1$ and $R^2$ are independently the same or different, and are independently CR$_2$=CR— (wherein, R is hydrogen or a methyl group) or CR$_2$=CRCO— (wherein, R is hydrogen or a methyl group).

The main monomer is not particularly limited, and may be, for example, alkyl(meth)acrylate, ethylene glycol di(meth)acrylate, triethylene glycol di(meth)acrylate, diethylene glycol di(meth)acrylate, 1,4-butanediol di(meth)acrylate, 1,6-hexanediol di(meth)acrylate, neopentyl glycol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol penta(meth)acrylate, pentaerythritol hexa(meth)acrylate, trimethylolpropane tri(meth)acrylate, ethylene glycol monomethyl ether (meth)acrylate, novolacepoxy (meth)acrylate, diethylene glycol di(meth)acrylate, triethylene glycol di(meth)acrylate, propylene glycol di(meth)acrylate, tris(meth)acryloyloxyethyl phosphate, or a combination thereof, but is not limited thereto.

A quantum dot-polymer composite including the first auxiliary monomer and/or the second auxiliary monomer may exhibit fast development time and improved linearity of a pattern, even if a large amount of quantum dots in the composite and inorganic light scatter are present.

The first auxiliary monomer may have 8 or more carbon-carbon double bonds (e.g., a (meth)acrylate group), for example, 10 or more carbon-carbon double bonds, or 12 or more carbon-carbon double bonds. The first auxiliary monomer may have 20 or less carbon-carbon double bonds. Without being bound by any particular theory, the first auxiliary monomer increases the number of a cross-linkable functional group and the functional group effectively participates in a cross-linking reaction, and thereby linearity may be improved due to improvement of pattern density.

The first auxiliary monomer may be a hyperbranched acrylate-based monomer. The hyperbranched monomer may have a regularly branched shape lime dendrimer. Alternatively, the hyperbranched monomer may have an incompletely branched or irregular structure. The first auxiliary monomer may further include one or more (e.g., 1 to 4) hydroxy groups, and pattern density and developability may be improved together. The first auxiliary monomer may be used alone or in a mixture of 2 or more monomers.

A weight average molecular weight of the first auxiliary monomer may be greater than or equal to about 300 g/mol, for example, about 300 g/mol to about 10,000 g/mol, or about 500 g/mol to about 800 g/mol.

The first auxiliary monomer may be synthesized by a known method or may be commercially available (e.g., ShinNakamira or Nippon Kayuku Co., Ltd.).

The second auxiliary monomer may be represented by Chemical Formula 1. For example, the second auxiliary monomer may be represented by one of Chemical Formula 1-1 and Chemical Formula 1-2:

Chemical Formula 1-1

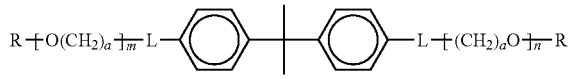

Chemical Formula 1-2

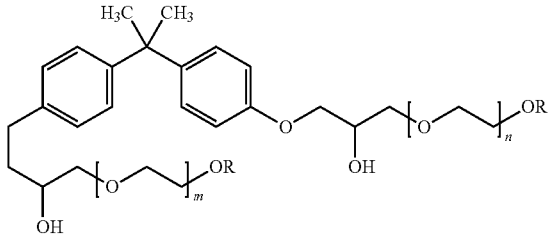

wherein,

R is the same or different, and are independently —COCR=CR$_2$ (R is hydrogen or a methyl group), a is an integer ranging from 1 to 5, m and n are the same as defined in Chemical Formula A, and L is the same or different, and is independently a single bond C1 to C10 alkylene, or —O—.

For example, the second auxiliary monomer may be bisphenol A ethylene glycol di(meth)acrylate, bisphenol A ethoxylate di(meth)acrylate, poly(ethylene glycol) reacted with bisphenol A glycidyl ether, bisphenol A di(meth)acrylate, bisphenol A epoxyacrylate, or a combination thereof.

A weight average molecular weight of the second auxiliary monomer may be greater than or equal to about 300 g/mol, for example, about 300 g/mol to about 10,000 g/mol or about 700 g/mol to about 1,500 g/mol.

When the photopolymerizable acryl-based monomer is used as a mixture, a content of the main monomer may be greater than or equal to about 60 wt %, for example, greater than or equal to about 65 wt % based on the total weight of the photopolymerizable monomer mixture. The content of the main monomer may be less than or equal to about 90 wt %, for example, less than or equal to about 85 wt % based on the total weight of the photopolymerizable monomer mixture.

A sum of the first auxiliary monomer and the second auxiliary monomer may be greater than or equal to about 10 wt %, for example, greater than or equal to about 15 wt % based on the total weight of the photopolymerizable acryl-based monomer mixture. In the photopolymerizable monomer mixture, a sum of the first auxiliary monomer and the second auxiliary monomer may be less than or equal to about 40 wt %, for example, less than or equal to 35 wt % based on the total weight of the photopolymerizable monomer mixture.

A ratio of the first auxiliary monomer to the second auxiliary monomer may be about 1:0.1 to about 1:10, for example, about 1:0.2 to 1:5, or about 1:0.25 to 1:4, about 1:0.5 to 1:2, about 1:0.7 to 1:1.3, or about 1:0.75 to 1:1.2, but is not limited thereto. In another embodiment, a content of the first auxiliary monomer is the same or greater than that of the second auxiliary monomer, but is not limited thereto.

A radical polymerization product (that is, a thiolene polymerization product) the photopolymerizable acryl-based monomer and the reactive compound having at least two thiol groups and represented by Chemical Formula 2 is known. For example, the thiolene polymerization product is disclosed in United States Patent Publication No. 2015-0218444 A1, which is incorporated herein by reference. The reactive compound may include a compound represented by Chemical Formula 2-1:

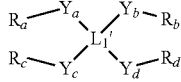

Chemical Formula 2-1 wherein, in Chemical Formula 2-1, $L_1'$ is carbon, a substituted or unsubstituted C2 to C20 alkylene group, a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, $Y_a$ to $Y_d$ are independently a single bond; a substituted or unsubstituted C1 to C30 alkylene group; a substituted or unsubstituted C2 to C30 alkenylene group; or a C1 to C30 alkylene group or C2 to C30 alkenylene group where at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine(—NR—)

(wherein R is hydrogen or a C1 to C10 linear or branched alkyl group), or a combination thereof, and $R_a$ to $R_d$ is $R^1$ or SH of Chemical Formula 2, provided that at least two of $R_a$ to $R_d$ is SH.

The reactive compound may prevent the luminous efficiency from deterioration by the heat treatment (e.g., post-baking), which is accompanied by the photoresist process of quantum dots dispersed in the obtained pattern obtained by further reacting with a photopolymerizable monomer that will be described later, without making unfavorable influences on the dispersion of quantum dots. Without being bound to specific theory, it is considered that the reactive compound makes the patterning polymer form denser network by further reacting with the photopolymerizable monomer that will be described later. In addition, the reactive compound may provide a bond between quantum dot and the photopolymerizable monomer to ensure the dispersion and stability. Particularly, the pattern formed from the photosensitive polymer composition including reactive compound may have improved photoluminescence properties (e.g., properties of maintaining the blue-photo-conversion rate), for example, even 2 times greater than or equal to about 2 times higher than when no reactive compound is included. In an embodiment, the photosensitive composition may maintain a blue photo-conversion rate of greater than or equal to about 40% of the initial value even after being developed by an alkali aqueous solution, dried, and then heated at 180° C. for 30 minutes.

Meanwhile, the addition of a thiol compound may increase the curing reaction rate on the photo-curing, and may make a larger difference in the curing rate between the upper part and the lower part of a pattern, causing the serious undercut phenomenon. However, the composition according to an embodiment may suppress/prevent the undercut phenomenon by including a mixture of the first photoinitiator and the second photoinitiator as a photoinitiator.

The reactive compound may be a dithiol compound, a trithiol compound, a tetrathiol compound, or a combination thereof. For example, the reactive compound may be glycol di-3-mercaptopropionate, glycol dimercapto acetate, trimethylolpropane tris(3-mercaptopropionate), pentaerythritol tetrakis(3-mercaptopropionate), pentaerythritol tetrakis(2-mercaptoacetate), 1,6-hexane dithiol, 1,3-propane dithiol, 1,2-ethane dithiol, polyethylene glycol dithiol including 1 to 10 ethylene glycol repeating units, or a combination thereof.

When present, a content of the reactive compound may be appropriately selected depending on the contents of the photopolymerizable acrylate-based monomer but is not particularly limited. The content of the reactive compound may be controlled so that a content of a thiol group may be about 0.1 moles (mol) to about 1 mol per 1 mol of an acryl group of the photopolymerizable acrylate-based monomer, but is not limited thereto.

The radical polymerization product of a photopolymerizable acryl-based monomer and/or a radical polymerization product of the photopolymerizable acryl-based monomer and a reactive compound having at least two thiol groups and represented by Chemical Formula 2 may be greater than or equal to about 0.5 wt %, for example, greater than or equal to about 1 wt %, greater than or equal to about 2 wt %, greater than or equal to about 3 wt %, greater than or equal to about 4 wt %, or greater than or equal to about 5 wt %, and less than or equal to about 59.5 wt %, less than or equal to about 50 wt %, less than or equal to about 40 wt %, less than or equal to about 30 wt %, less than or equal to about 20 wt %, less than or equal to about or 10 wt % based on the total weight of the quantum dot-polymer composite, but is not limited thereto.

The quantum dot-polymer composite may further include various additives such as a light scatter, a leveling agent, or a coupling agent in addition to the above components, as needed. The content of the additive is not particularly limited but may be appropriately controlled within the range which does not make unfavorable influences on patterning of the quantum dot-polymer composite.

The light scatter may increase a refractive index of the composite, thereby increasing the possibility of incident light to enter into the composition with quantum dots. The light scatter may include inorganic oxide particles such as alumina, silica, zirconia, titanium oxide particulates, or zinc oxide, and metal particles such as gold, silver, copper, or platinum, but is not limited thereto.

The leveling agent prevents stains or spots and improves leveling properties of a composition before forming a composite. The leveling agent is not particularly limited. For example, examples of the fluorine-based a leveling agent may include commercial products, for example BM-1000®, and BM-1100® (BM Chemie Inc.); MEGAFACE F 142D®, F 172®, F 173®, and F 183® of Dainippon Ink Kagaku Kogyo Co., Ltd.; FC-135®, FC-170C®, FC-430®, and FC-431® of Sumitomo 3M Co., Ltd.; SURFLON S-112®, SURFLON S-113®, SURFLON S-131®, SURFLON S-141®, and SURFLON S-145® of Asahi Glass Co., Ltd.); and SH-28PA®, SH-190®, SH-193®, SZ-6032®, and SF-8428®, and the like of Toray Silicone Co., Ltd.).

The coupling agent may be used to increase adherence of the quantum dot-polymer composite or a composition therefor with a substrate and may be a silane-based coupling agent. Specific examples of the silane-based coupling agent may be vinyl trimethoxysilane, vinyl tris(2-methoxyethoxysilane), 3-glycidoxypropyl trimethoxysilane, 2-(3,4-epoxy cyclohexyl)ethyl trimethoxysilane, 3-chloropropyl methyldimethoxysilane, 3-chloropropyl trimethoxysilane, 3-methacryloxylpropyl trimethoxysilane, 3-mercaptopropyl trimethoxysilane, and the like. Types and amounts of the additive may be adjusted as needed.

A quantum dot-polymer composite according to an embodiment may be produced by preparing a composition including the quantum dot and the components, and polymerizing/curing the composition. In an embodiment, the composition may be a photosensitive composition that further includes a photopolymerizable initiator. Using the photosensitive composition, a quantum dot-polymer composite may be patterned by a conventional photoresist process.

When it is present, a content of the additive may be greater than or equal to about 0.1 wt %, for example, greater than or equal to about 0.5 wt %, greater than or equal to about 1 wt %, greater than or equal to about 2 wt %, or greater than or equal to about 5 wt % based on the total weight of the composite, but is not limited thereto. When it is present, the content of the additive may be less than or equal to about 20 wt %, less than or equal to about for example, 19 wt %, less than or equal to about 18 wt %, less than or equal to about 17 wt %, less than or equal to about 16 wt %, or less than or equal to about 15 wt %, but is not limited thereto.

The photosensitive composition may be prepared by a method including
preparing a binder solution including the carboxylic acid group (—COOH)-containing binder and an organic solvent;
dispersing a plurality of quantum dots in the binder solution to obtain quantum dot-binder dispersion;
mixing the quantum dot-binder dispersion with a photoinitiator; a photopolymerizable acryl-based monomer; and optionally, at least one of a thiol-based reactive compound and one or more of the aforementioned additives.

The carboxylic acid group (—COOH)-containing binder, the quantum dot, the photopolymerizable acryl-based monomer, the thiol-based reactive compound, and the additives may be the same as described above.

The organic solvent of the photosensitive composition is not particularly limited. Types and amounts of the organic solvent may be determined considering the amounts of the main components (i.e., the quantum dot, the COOH group-containing binder, the reactive compound, the photopolymerizable monomer, and the photoinitiator), and other additives.

For example, the photosensitive composition may include:
about 1 wt % to about 40 wt % of the quantum dot;
about 0.5 wt % to about 35 wt % of the carboxylic acid group-containing binder;
about 0.5 wt % to about 30 wt % (e.g., about 0.5 wt % to about 20 wt %) of the photopolymerizable monomer;
about 0.1 wt % to about 40 wt % (e.g., about 0.5 wt % to about 15 wt %) of the reactive compound; and
about 0.01 wt % to about 10 wt % of the photoinitiator; and
a balance amount of a solvent, based on the total weight of the composition, but is not limited thereto.

The photosensitive composition may include a balance amount of the solvent except amounts of desirable solids (non-volatiles). The solvent may be appropriately selected considering affinity for other components in the composition (e.g., a binder, a photopolymerizable monomer, a photoinitiator, and other additives), affinity for an alkaline developer solution, a boiling point, and the like. Examples of the solvent may be ethylene glycols such as ethyl 3-ethoxy propionate, ethylene glycol, diethylene glycol, or polyethylene glycol; glycol ethers such as ethylene glycol monomethyl ether, ethylene glycol monoethyl ether, diethylene glycol monomethyl ether, ethylene glycol diethyl ether, or diethylene glycol dimethyl ether; glycol ether acetates such as ethylene glycol acetate, ethylene glycol monoethyl ether acetate, diethylene glycol monoethyl ether acetate, or diethylene glycol monobutyl ether acetate; propylene glycols such as propylene glycol; propylene glycol ethers such as propylene glycol monomethyl ether, propylene glycol monoethyl ether, propylene glycol monopropyl ether, propylene monobutyl ether, propylene glycol dimethyl ether, dipropylene glycol dimethyl ether, propylene glycol diethyl ether, or dipropylene glycol diethyl ether; propylene glycol ether acetates such as propylene glycol monomethyl ether acetate, or dipropylene glycol monoethyl ether acetate; amides such as N-methylpyrrolidone, dimethyl formamide, or dimethyl acetamide; ketones such as methyl ethyl ketone (MEK), methyl iso-butyl ketone (MIBK), or cyclohexanone; petroleums such as toluene, xylene, or solvent naphtha; esters such as ethyl acetate, butyl acetate, or ethyl lactate; ethers such as diethyl ether, dipropyl ether, and dibutyl ether; and a mixture thereof.

The photoinitiator of the photosensitive composition may include a compound that initiates radical polymerization of the photo-polymerizable acryl based monomer and/or the thiol-based reactive compound by light. Types of the photoinitiator are not particularly limited. The photoinitiator may include a triazine-based compound, an acetophenone compound, a benzophenone compound, a thioxanthone compound, a benzoin compound, an oxime ester compound, an aminoketone compound, a phosphine or phosphine oxide compound, a carbazole-based compound, a diketone compound, a sulfonium borate-based compound, a diazo-based compound, a is-imidazole-based compound, or a combination thereof, but is not limited thereto.

For non-limiting examples, the triazine-based compound may include 2,4,6-trichloro-s-triazine, 2-phenyl-4,6-bis (trichloromethyl)-s-triazine, 2-(3',4'-dimethoxystyryl)-4,6-bis(trichlorom ethyl)-s-triazine, 2-(4'-m ethoxynaphthyl)-4, 6-bis(trichloromethyl)-s-triazine, 2-(p-methoxyphenyl)-4,6-bis(trichloromethyl)-s-triazine, 2-(p-tolyl)-4,6-bis (trichloromethyl)-s-triazine, 2-biphenyl-4,6-bis (trichloromethyl)-s-triazine, bis(trichloromethyl)-6-styryl-s-triazine, 2-(naphthol-1-yl)-4,6-bis(trichloromethyl)-s-triazine, 2-(4-methoxynaphthol-1-yl)-4,6-bis (trichloromethyl)-s-triazine, 2,4-trichloromethyl (piperonyl)-6-triazine, and 2,4-(trichloromethyl (4'-methoxystyryl)-6-triazine, but is not limited thereto.

Examples of the acetophenone-based compound may include 2,2'-diethoxyacetophenone, 2,2'-dibutoxyacetophenone, 2-hydroxy-2-methylpropiophenone, p-t-butyltrichloroacetophenone, p-t-butyldichloroacetophenone, 4-chloroacetophenone, 2,2'-dichloro-4-phenoxyacetophenone, 2-methyl-1-(4-(methylthio)phenyl)-2-morpholinopropan-1-one, 2-benzyl-2-dimethylamino-1-(4-morpholinophenyl)-butan-1-one, and the like, but are not limited thereto.

Examples of the benzophenone-based compound may include benzophenone, benzoyl benzoate, benzoyl methyl benzoate, 4-phenylbenzophenone, hydroxybenzophenone, acrylated benzophenone, 4,4'-bis(dimethylamino)benzophenone, 4,4'-dichlorobenzophenone, 3,3'-dimethyl-2-methoxybenzophenone, and the like, but are not limited thereto.

Examples of the thioxanthone-based compound may include thioxanthone, 2-methylthioxanthone, iso-propylthioxanthone, 2,4-diethylthioxanthone, 2,4-diiso-propylthioxanthone, 2-chlorothioxanthone, and the like, but are not limited thereto.

Examples of the benzoin-based compound may include benzoin, benzoin methyl ether, benzoin ethyl ether, benzoin iso-propyl ether, benzoin iso-butyl ether, benzyl dimethyl ketal, and the like, but are not limited thereto.

Examples of the oxime-based compound may include 2-(o-benzoyloxime)-1-[4-(phenylthio)phenyl]-1,2-octane-dione and 1-(o-acetyloxime)-1-[9-ethyl-6-(2-methylbenzoyl)-9H-carbazol-3-yl]ethanone but are not limited thereto.

Each component may be mixed sequentially or simultaneously, but mixing orders are not particularly limited.

The preparation of the photosensitive composition may further include selecting a quantum dot including an organic ligand (e.g., having a hydrophobic moiety) on a surface thereof, and selecting a carboxylic acid group-containing binder that may disperse the selected quantum dot. The selecting of the binder may depend on a chemical structure and an acid value of the copolymer included therein.

The photosensitive composition may be developed using an alkaline aqueous solution, and thus, using the aforementioned photosensitive composition makes it possible to form a quantum dot-polymer composite pattern without using an organic developer.

Figure 3:
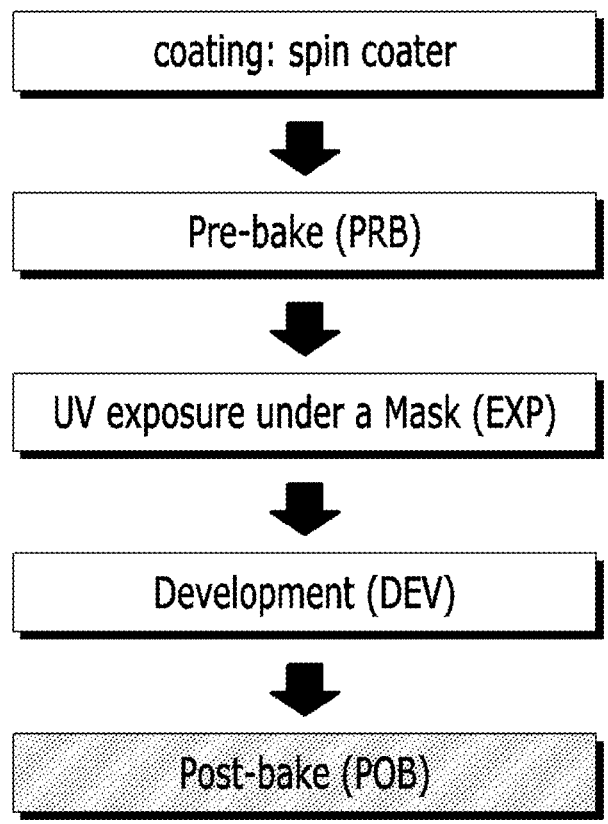
FIG. 3 is a schematic flow chart of a production process of a quantum dot-polymer composite pattern according to an embodiment.
Figure 3:
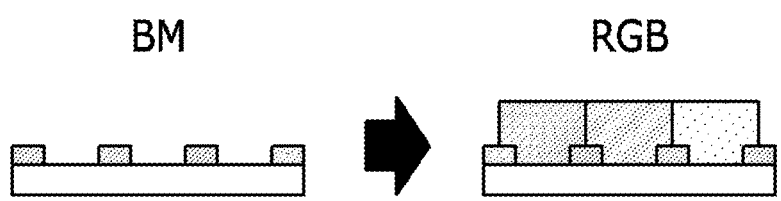

Non-limiting method for forming a pattern is explained referring to FIG. 3.

The photosensitive composition is coated on a substrate (e.g., a polymer substrate, a glass substrate, or a glass substrate coated with a predetermined thickness (e.g., about 500 to about 1,500 Angstroms, A) of $SiN_x$ (a protective layer)) with using an appropriate method such as a spin coating, a slit coating or the like to form a film having a predetermined thickness (e.g., a thickness of about 3 micrometers (μm) to about 30 μm). The formed film may be pre-baked, if desired. Conditions (e.g., a temperature, a time, an atmosphere, and the like) for the pre-baking may be selected appropriately.

The film as formed and optionally pre-baked is exposed to light of a predetermined wavelength under a mask having a predetermined pattern. The wavelength and the intensity of light may be selected considering the type and the amount of photoinitiator, and the type and the amount of quantum dot or the like.

The exposed film is treated (e.g., dipped or sprayed) with an alkaline developer solution, and thereby the unexposed region of the film is dissolved to provide a desirable pattern. The obtained pattern may be post-baked at a temperature of, for example, about 150° C. to about 230° C. (e.g., 180° C.) for a predetermined time (e.g., greater than or equal to about 10 minutes, or greater than or equal to about 20 minutes) in order to improve the crack-resistance and the solvent-resistance of the pattern.

In order to use the aforementioned quantum dot-polymer composite as a color filter, two or three types of photosensitive compositions including a red quantum dot, a green quantum dot, (and optionally, a blue quantum dot) may be prepared, and a patterning process for each of the compositions is repeated to provide a desirable pattern of the quantum dot-polymer composite.

A quantum dot-polymer composite according to an embodiment may have improved photoluminescence properties even in the case of performing the post-bake process. For example, the quantum dot-polymer composite may maintain a photo-conversion rate at about 40% or higher of the photoconversion rate of the photosensitive composition. The quantum dot-polymer composite or the pattern thereof may exhibit a photo-conversion rate that is greater than or equal to about 45%, for example, greater than or equal to about 50%. The quantum dot-polymer composite may exhibit a front surface (i.e., top emission) photo-conversion rate of greater than or equal to about 16%.

Another embodiment provides an electronic device including the quantum dot-polymer composite. The electronic device may be a light emitting diode (LED), an organic light emitting diode (OLED), a sensor, an imaging sensor, or a solar cell electronic device, or a liquid crystal display (LCD) device, but is not limited thereto. The quantum dot-polymer composite may have a pattern that greater than or equal to two different color sections (e.g., RGB color sections) are repeated. This quantum dot-polymer composite pattern replaces an absorption-type color filter in a liquid crystal display, and thus, may be used as a photoluminescent color filter.

Figure 4:
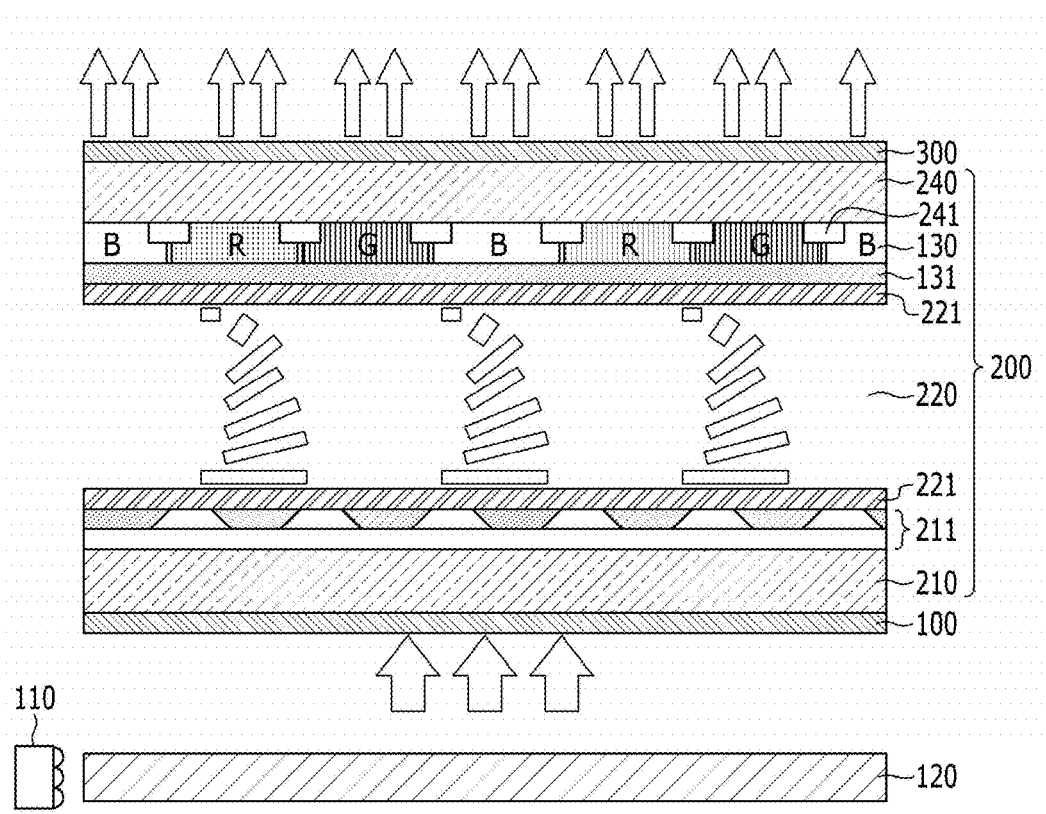
FIG. 4 is a schematic cross-sectional view showing a liquid crystal display (LCD) including a quantum dot-polymer composite according to an embodiment.
Figure 5:
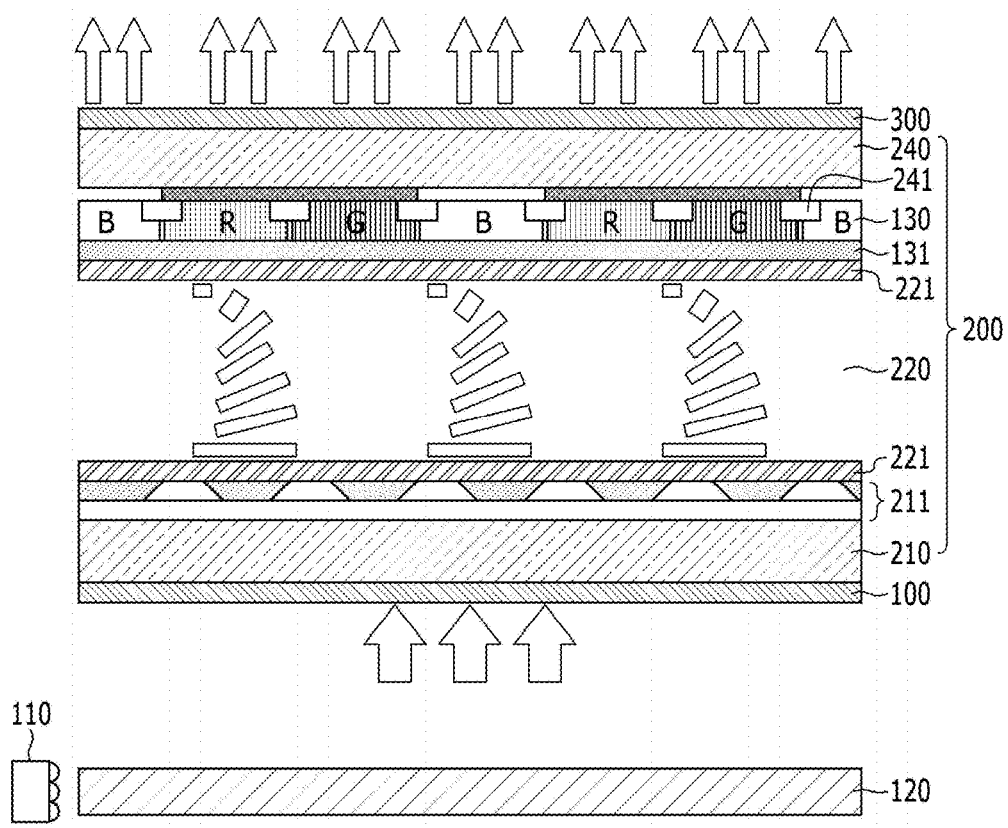
FIG. 5 is a schematic cross-sectional view showing a liquid crystal display (LCD) including a quantum dot-polymer composite according to another embodiment.
Figure 6:
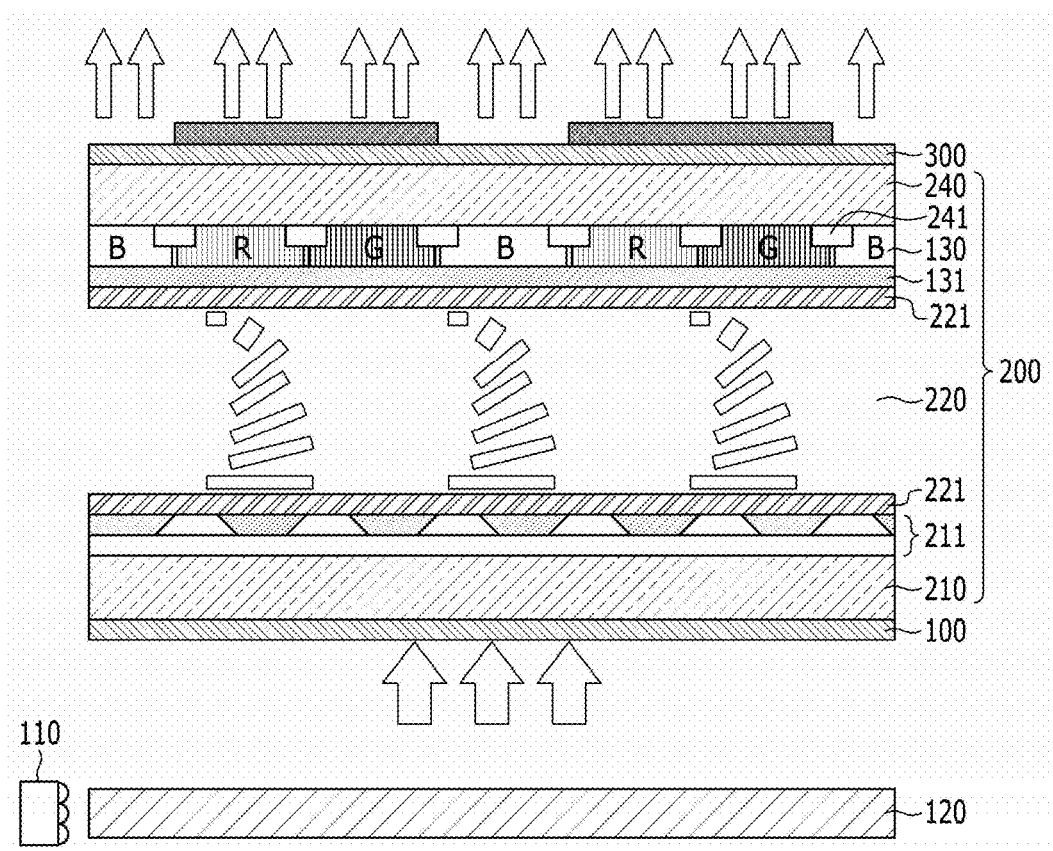
FIG. 6 is a schematic cross-sectional view showing a liquid crystal display (LCD) including a quantum dot-polymer composite according to another embodiment.
Figure 7:
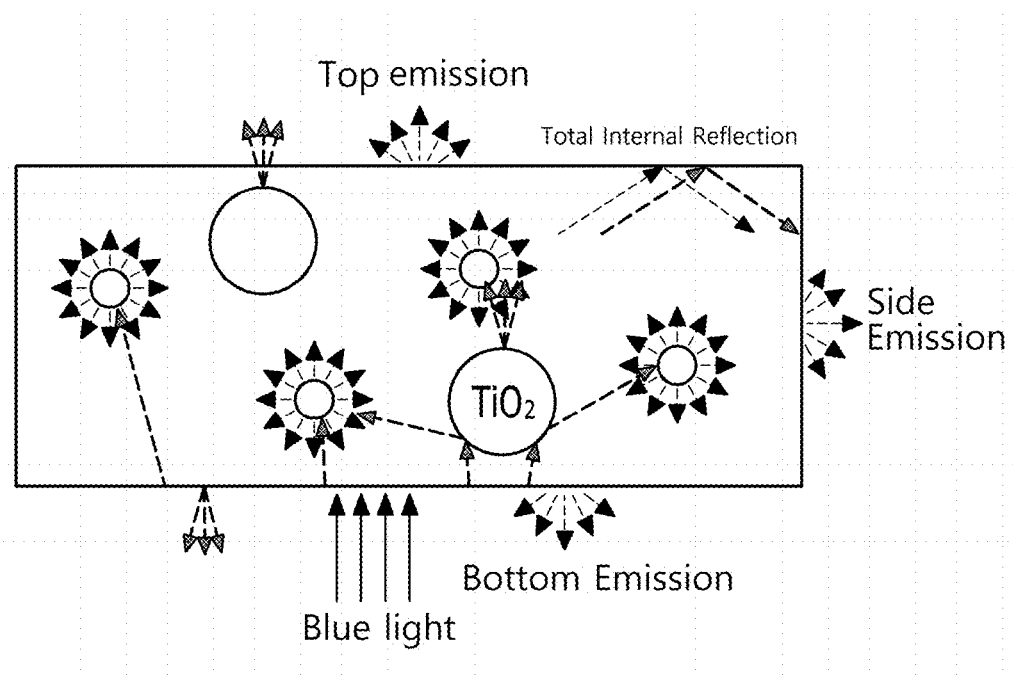
FIG. 7 is a cross-sectional schematic view showing a quantum dot-polymer composite according to an embodiment.

FIGS. 4 to 6 are schematic views showing a liquid crystal display using the quantum dot-polymer composite pattern as a photoluminescent color filter, and FIG. 7 shows the cross section of the composite.

Referring to FIG. 4, a photoluminescence liquid crystal display according to an embodiment includes a liquid crystal panel 200, an optical device (300 or 100) (e.g., a polarizer) respectively disposed on and beneath the liquid crystal panel 200, and a backlight unit disposed beneath the lower optical device 100. The backlight unit may include a light source 110 (e.g., emitting blue light) and a light guide 120, but is not limited thereto. The liquid crystal panel 200 includes a lower substrate 210, an upper substrate 240, a liquid crystal layer 220 disposed between the upper and lower substrates, a photoluminescent color filter layer 130 (that is, the above quantum dot-polymer composite pattern) at the bottom of the upper substrate 240, and a black matrix 241. The liquid crystal layer 220 may include an alignment layer 221 on top and at the bottom thereof for initial orientation of a liquid crystal material included therein. Specific contents of the liquid crystal material and the alignment layer (e.g., a liquid crystal material, an alignment layer material, a method of forming a liquid crystal layer, the thickness of the liquid crystal layer, and the like) are known, but are not particularly limited. A transparent common electrode 131 may be provided in the photoluminescent color filter 130.

A wiring board 211 may be provided on the lower substrate 210. The wiring board 211 may include a plurality of gate wire (not shown) defining a pixel area, a data wire (not shown), a thin film transistor neighboring a crossing region of the gate wire and the data wire, and a pixel electrode for each pixel area, but is not limited thereto. Details of the wiring board are known in the art and the wiring board is not particularly limited.

For example, the quantum dot-polymer composite pattern may have a first color section (R) emitting red light having a peak emission wavelength between about 620 nm to about 650 nm and a second color section (G) emitting green light having a peak emission wavelength between about 520 nm to about 550 nm. The pattern may further include a third color section (B) passing and/or emitting blue light having a peak emission wavelength between about 450 nm to about 480 nm. Selectively, the photoluminescent color filter layer may further include at least one fourth color section emitting a color (e.g., cyan, magenta, and yellow) other than the red, green and blue.

On the red light-emitting section (R) (hereinafter, a first color filter) and the green light-emitting section (G) (hereinafter, a second color filter) of the photoluminescent color filter, a blue light-blocking layer (a blue filter) may be disposed. The blue light-blocking layer may be disposed between the first and second color filters (R and G) and the upper substrate 300 (FIG. 5). Alternately, the blue light-blocking layer may be disposed on the optical device 300 (FIG. 6). The blue light-blocking layer may be a sheet having an opening in a region corresponding to a pixel area (the third color filter) displaying blue and is formed in a region corresponding to the first and second color filters. In an embodiment, the blue light-blocking layer may be formed by alternatively stacking at least two layers having different refractive indexes and passing light having other wavelengths except for a blue wavelength, but blocking light having the blue wavelength. The blocked light having the blue wavelength may be reflected and optically recycled. The blue light-blocking layer may play a role of blocking direct leakage of light emitted from the blue light source 110.

Referring to FIG. 7, incident light (e.g., blue light) from a light source enters the quantum dot polymer composite and is emitted as light having a desired wavelength converted by quantum dots dispersed in the composite. A part of the light is emitted through a front side, but a part of the light may be emitted through a rear side and a side. When the incident light (e.g., blue light) from a light source is converted by quantum dots at a high total photo-conversion rate, luminous efficiency at the front side is increased, and luminance of a device may be improved. A light scatter included in the composite may contribute to improving the photo-conversion rate.

Hereinafter, the exemplary embodiments are illustrated in more detail with reference to specific examples. However, they are exemplary embodiments, and the present disclosure is not limited thereto.

EXAMPLES

Analysis Method

[1] Analysis of Photoluminescence such as Quantum Efficiency

Using a Hitachi F-7000 spectrometer, a photoluminescence (PL) spectrum of a nanocrystal obtained at an irradiation wavelength of 458 nanometers (nm) is obtained (in the case of red QD, at 532 nm).

[2] UV Spectroscopy Analysis

Using a Hitachi U-3310 spectrometer, it is performed with UV spectroscopy analysis to provide a UV-Visible absorption spectrum.

[3] TEM Analysis and EDX Analysis

Using UT F30 Tecnai electron microscope, a transmission electron microscope image of the obtained nanocrystal is obtained. An EDX analysis is performed using a Osiris 200 kV TEM (FEI)-4 EDS detectors (Bruker).

[4] ICP Analysis

Using Shimadzu ICPS-8100, an inductively coupled plasma atom light emitting spectroscopy analysis (ICP-AES) is performed.

[5] HAADF STEM Analysis

Using Titan ChemiSTEM 200 kV (FEI), a HAADF STEM analysis is performed.

Production of Core-Shell Quantum Dot Including Shell Having Branch-Valley

Reference Example 1: Preparation of InZnP Core 0.2 millimoles (mmol) of indium acetate, 0.125 mmol of zinc acetate, 0.6 mmol of palmitic acid, 10 milliliters (mL) of 1-octadecene are placed into a reactor and heated at 120° C. under the vacuum. After one hour, the atmosphere in the reactor is replaced with nitrogen. The solution is heated to 280° C., and then a mixed solution of 0.15 mmol of tris(trimethylsilyl)phosphine ($TMS_3P$) and 1 mL of trioctylphosphine is rapidly injected thereto and reacted for 20 minutes. The reacted solution is rapidly cooled to room temperature, and then acetone is added thereto. The resulting mixture is subjected to centrifugation to separate a precipitate, which is then dispersed in toluene. From a UV spectrum of the InP semiconductor nanocrystal, it is confirmed that a UV first absorption maximum wavelength is 440 nm and a core diameter is 2.2 nm.

Example 1: Core-Shell Quantum Dot with a Shell of a Branch-Valley Structure (InZnP/ZnSeS)

1.8 mmoL (0.336 grams, g) of zinc acetate, 3.6 mmol (1.134 g) of oleic acid, and 10 mL of trioctylamine are placed into a flask, which is evacuated at 120° C. for 10 minutes. The inside of the flask is substituted with nitrogen ($N_2$) and heated at 180° C. The InZnP core obtained from Reference Example 1 is placed therein within 10 seconds, and subsequently, 0.04 mmol of Se/TOP is slowly injected and then heated at 280° C. Then 0.01 mmol of S/TOP is placed thereto and heated at 320° C. and reacted for 10 minutes. Continuously, a mixed solution of 0.02 mmol of Se/TOP and 0.04 mmol of S/TOP is slowly injected and reacted again for 20 minutes. Then, the step of injecting Se and S by changing the mixing ratio thereof and reacting the same for 20 minutes is repeated. The mixed solution of Se and S uses a mixed solution of 0.01 mmol Se/TOP+0.05 mmol S/TOP, a mixed solution of 0.005 mmol Se/TOP+0.1 mmol S/TOP, and a mixed solution of 0.5 mmol S/TOP, sequentially.

After completing all of the reactions, the reactor is cooled, the prepared nanocrystal is precipitated with ethanol, and the obtained nanocrystal is centrifuged with ethanol and dispersed in toluene.

Figure 8:
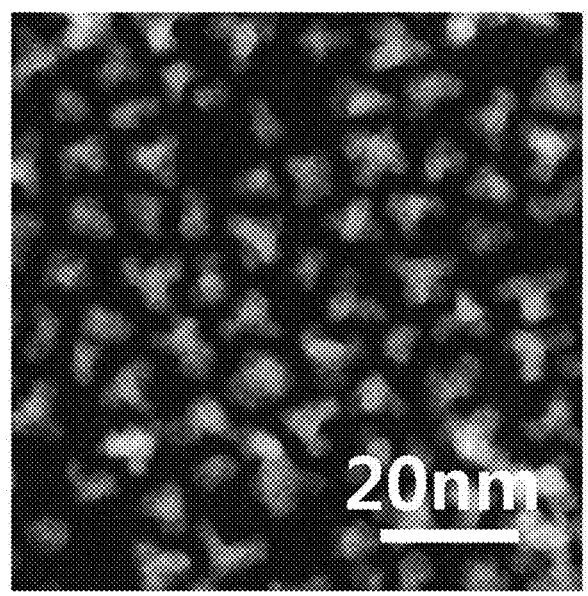
FIG. 8 is a transmission electron microscope image showing a semiconductor nanocrystal particle obtained from Example 1.
Figure 9:
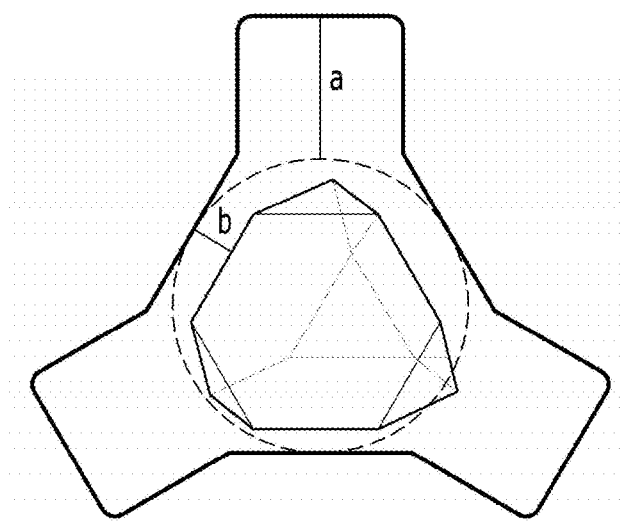
FIG. 9 is a schematic view showing the shape of a semiconductor nanocrystal particle obtained from Example 1.

A transmission electron microscope image of the prepared quantum dot is shown in FIG. 8. The particle shape of the prepared quantum dot is schematically shown in FIG. 9.

The photoluminescence properties of the quantum dot are analyzed, and the results are provided in Table 1. The inductive coupling plasma analysis of the quantum dot is performed, and the results are provided in Table 1.

From the photoluminescence wavelength of the core, the diameter of the core is obtained. The diameter of the core and the inductive coupling plasma analysis result of the quantum dot are used to calculate a shell thickness. The obtained semiconductor nanocrystal has a size as follows:

Core diameter=2.2 nm
Core-shell diameter=5.6 nm
Shell thickness=1.7 nm

Figure 12:
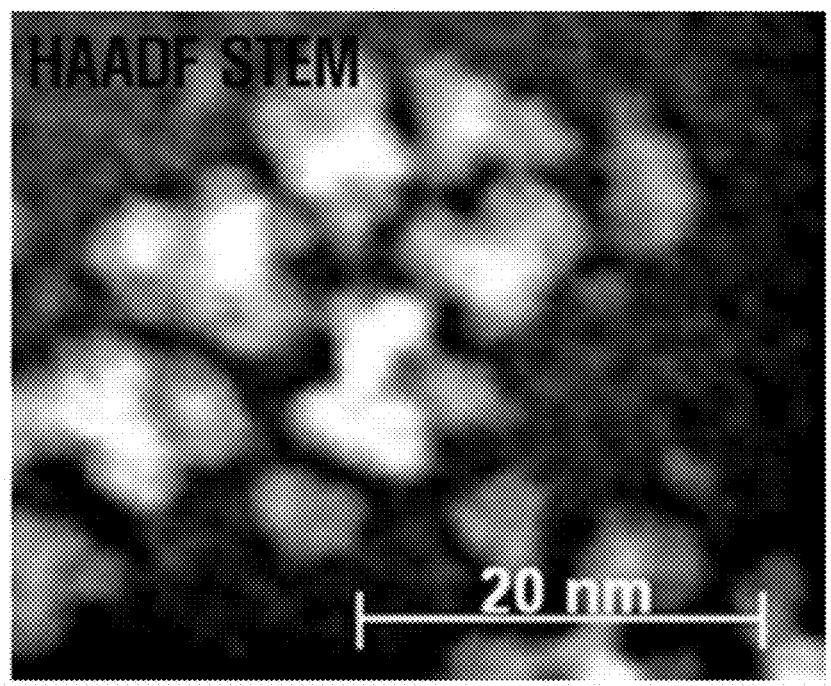
FIG. 12 is a High-Angle Annular dark-field scanning transmission electron microscopy (HAADF-STEM) image showing a semiconductor nanocrystal particle obtained from Example 1.
Figure 13:
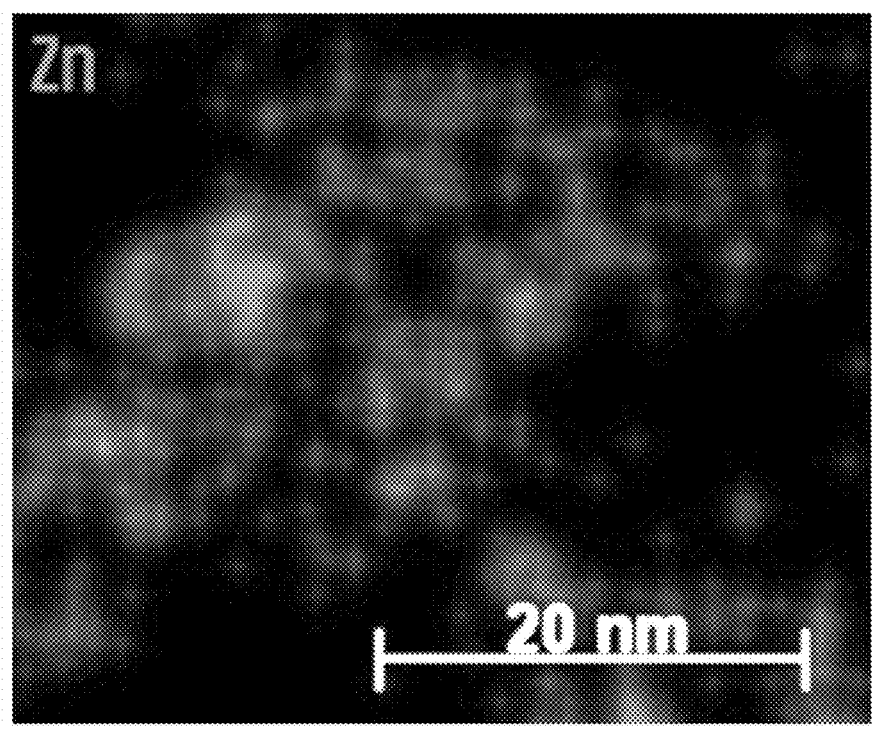
FIG. 13 shows a part of the EDX analysis result (Zn elemental mapping) of a quantum dot particle obtained from Example 1.
Figure 14:
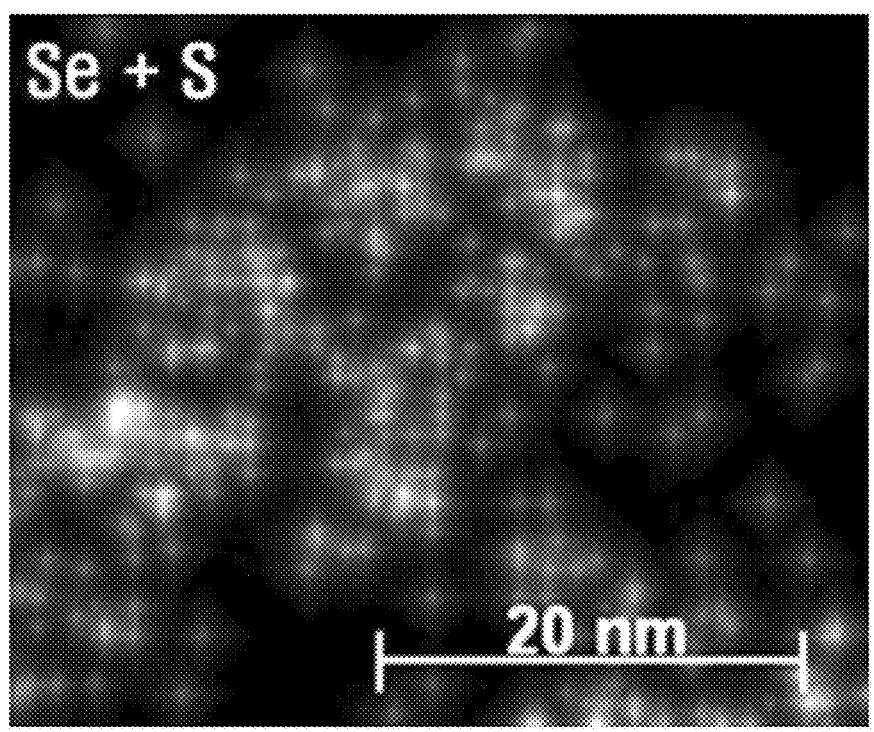
FIG. 14 shows a part of the EDX analysis result (Se element and S elemental mapping) of the quantum dot according to Example 1.

The HAADF STEM analysis of the quantum dot is performed, and the results are provided in FIG. 12. The EDX-mapping analysis of the quantum dot is performed, and the results are provided in FIGS. 13 and 14. Referring to the results of FIGS. 12, 13, and 14, the quantum dot has a core-shell structure including a shell having greater than or equal to 2 (e.g., 3) branches and a valley portion connecting the branches. The amount of ZnS is increased as it goes to the end of the branches (i.e., the branches have a different composition depending on a length).

Comparative Example 1: Core-Shell Quantum Dot without Branch (InP/ZnSeS)

A quantum dot is synthesized in the same manner of Example 1 except for the followings:

a core (with a diameter: 2.3 nm) manufactured in the same method as Reference Example 1 except for not using 0.125 mmol of zinc acetate is used, 0.01 mmol of Se/TOP is slowly injected, the resulting mixture is then heated to 280° C., 0.04 mmol of S/TOP is injected thereto, and the reaction proceeds at 320° C.

Figure 10:
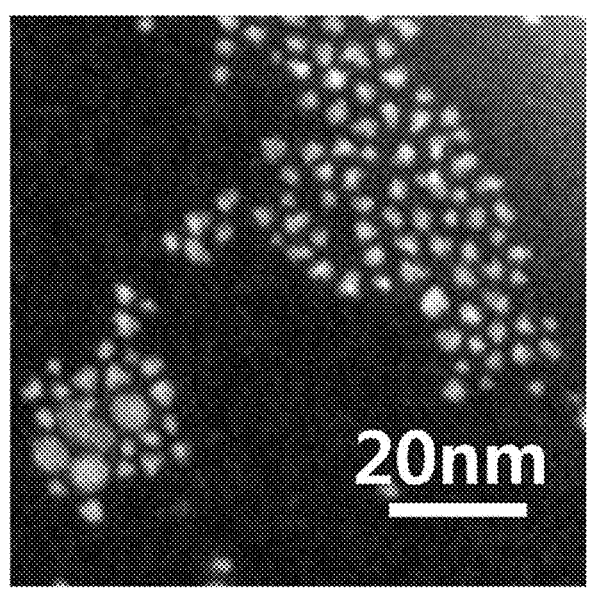
FIG. 10 is a transmission electron microscope image showing a semiconductor nanocrystal particle obtained from Comparative Example 1.
Figure 11:
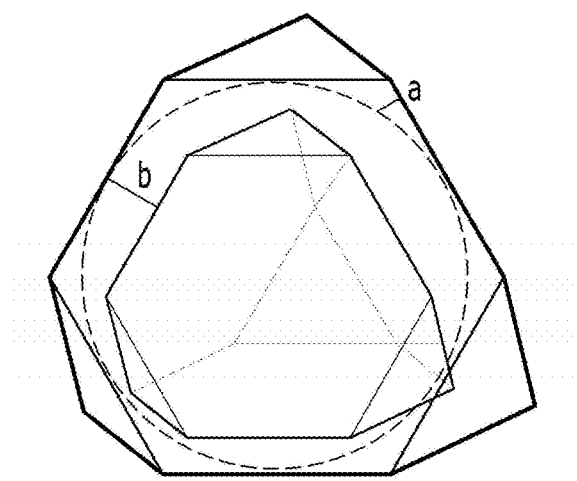
FIG. 11 is a schematic view showing the shape of a semiconductor nanocrystal particle obtained from Comparative Example 1.

The transmission electron microscope image of the prepared quantum dot is provided in FIG. 10. FIG. 11 is a schematic view showing the particle shape of the prepared quantum dot. The results confirm that the prepared quantum dot has a structure in which a branch is not developed.

The photoluminescence properties of the quantum dot are analyzed, and the results are provided in Table 1. The inductive coupling plasma analysis of the quantum dot is performed, and the results are provided in Table 1. The size of the quantum dot calculated from the results is as follows:

Core diameter=2.3 nm
Core-shell diameter=3.8 nm
Shell thickness (b)=0.75 nm

Example 2: Core-Shell Quantum Dot Having Shell of Branch-Valley Structure (InZnP/ZnS//B(S)/ZnS)

Figure 15:
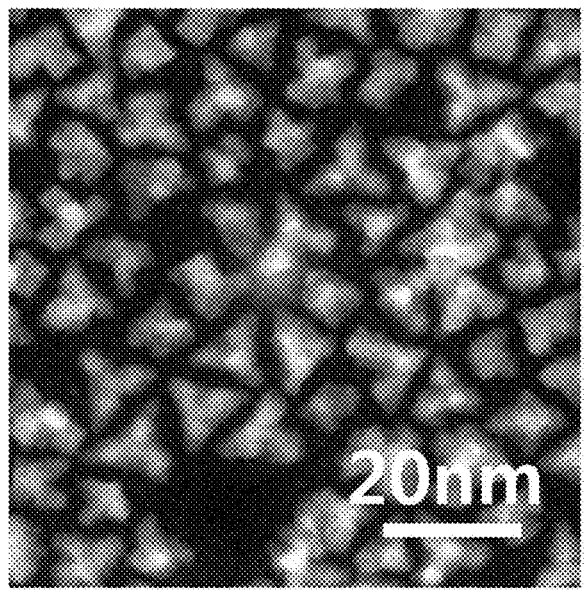
FIG. 15 is a transmission electron microscope image showing a quantum dot obtained from Example 2.

1.8 mmoL (0.336 g) of zinc acetate, 3.6 mmol (1.134 g) of oleic acid, and 10 mL of trioctylamine are placed in a flask, which is evacuated at 120° C. for 10 minutes. After filling the interior of the flask with nitrogen ($N_2$), the flask is heated to 180° C. Then, the InZnP/ZnSeS quantum dot synthesized according to Example 1 is added thereto within 10 seconds, 0.01 mmol of Se/TOP and 0.5 mmol of S/TOP are slowly injected thereinto, and the resulting mixture is heated up to 320° C. and reacted for 20 minutes. Then, 0.5 mmol of S/TOP is added thereto, and the mixture is additionally reacted for 20 minutes. FIG. 15 provides the transmission electron microscope image of the resultant:

Referring to FIG. 15, branches are connected by a concave valley portion.

The photoluminescence properties of the quantum dot are analyzed, and the results are provided in Table 1. The inductive coupling plasma analysis of the quantum dot is performed, and the results are provided in Table 1. The size of the quantum dot calculated from the result is as follows:

Core diameter=2.2 nm
Core-shell diameter=7.5 nm
Shell thickness (b)=about 2.7 nm Comparative Example 2: Core-Shell Quantum Dot Having Shell without Branch-Valley (InP/ZnS)

An InP/ZnS core-shell quantum dot is synthesized in the following manner:

0.2 mmol of indium acetate, 0.6 mmol of palmitic acid, and 10 mL of 1-octadecene are placed in a reactor and heated at 120° C. under vacuum. One hour later, an atmosphere in the reactor is replaced with nitrogen. After heating the reactor at 280° C., a mixed solution of 0.1 mmol of tris (trimethylsilyl)phosphine ($TMS_3P$) and 1 mL of trioctylphosphine is rapidly injected thereinto, and the mixture is reacted for 60 minutes. After rapidly cooling down the reaction solution to room temperature, acetone is added thereto, and a precipitate obtained by centrifuging the mixture is dispersed in toluene. In the UV spectrum of the InP semiconductor nanocrystal (core), a first UV absorption maximum wavelength of 580 nm and a core diameter of 3.8 nm are measured.

0.6 mmol (0.112 g) of zinc acetate, 1.2 mmol (0.378 g) of oleic acid, and 10 mL of trioctylamine are placed into a flask, which is evacuated at 120° C. for 10 minutes. The atmosphere of the flask is replaced with nitrogen ($N_2$), and then the flask is heated up to 180° C. Subsequently, the InP core is added thereto within 10 seconds, 0.6 mmol of S/TOP is slowly injected thereinto, and the mixture is heated up to 280° C. and reacted for one hour. When the reaction is complete, the reactor is cooled to room temperature, and ethanol is added to the reaction solution to precipitate nanocrystals, which are then centrifuged and dispersed in toluene.

Figure 16:
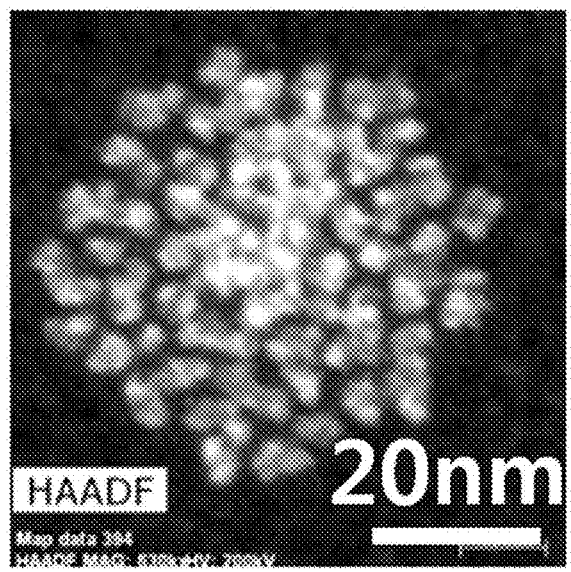
FIG. 16 is a transmission electron microscope image showing the quantum dot obtained from Comparative Example 2.

FIG. 16 provides the transmission electron microscope image of the nanocrystal.

The photoluminescence properties of the quantum dot are analyzed, and the results are provided in Table 2. The inductive coupling plasma analysis of the quantum dot is performed, and the results are provided in Table 2. The size of the quantum dot calculated from the results is as follows:

Core diameter=3.8 nm
Core-shell diameter=5.0 nm
Shell thickness=0.6 nm

Example 3: Core-Shell Quantum Dot Having Shell of Branch-Valley Structure (InP/ZnSeS)

0.6 mmol (0.112 g) of zinc acetate, 1.2 mmol (0.378 g) of oleic acid, and 10 mL of trioctylamine are placed in a flask, which is evacuated at 120° C. for 10 minutes. After filling the interior of the flask with nitrogen ($N_2$), the flask is heated up to 180° C. Subsequently, the InP core according to Comparative Example 2 is added to the flask within 10 seconds, 0.01 mmol of Se/TOP is slowly injected thereinto, and the mixture is heated up to 280° C. Then, 0.01 mmol of S/TOP is added thereto, and the obtained mixture is heated up to 320° C. and reacted for 10 minutes. Subsequently, a mixed solution of 0.005 mmol of Se/TOP and 0.04 mmol of S/TOP is slowly injected thereinto, and the resulting mixture is reacted again for 20 minutes. Then, when a step of injecting Se and S by changing their mixing ratio and reacting the obtained mixture for 20 minutes is repeated, a mixed solution of Se and S used herein is a mixed solution of 0.005 mmol of Se/TOP+0.1 mmol of S/TOP and 0.5 mmol of a S/TOP solution, which are sequentially used.

When the reaction is complete, the reactor is cooled down, the nanocrystal is precipitated by adding ethanol to the reaction solution, centrifuged, and dispersed in toluene.

Figure 17:
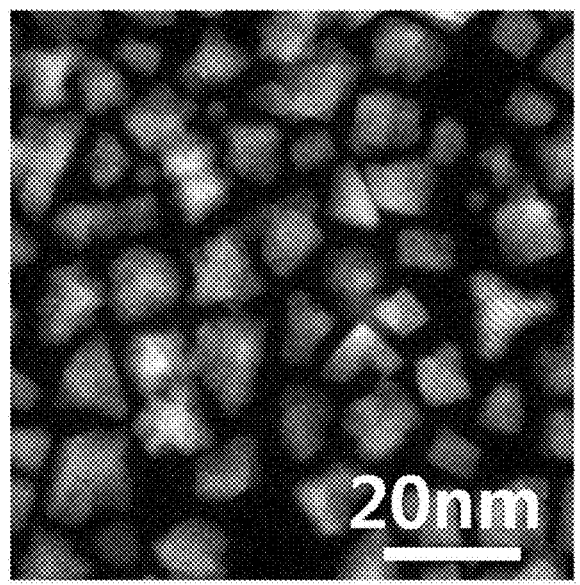
FIG. 17 is a transmission electron microscope image showing a quantum dot obtained from Example 3.

FIG. 17 shows the transmission electron microscope image of the nanocrystal.

FIG. 16 shows that branches are connected by a concave valley portion. The photoluminescence properties of the quantum dot are analyzed, and the results are provided in Table 2. The inductive coupling plasma analysis of the quantum dot is performed, and the results are provided in Table 2. The size of the quantum dot calculated from the result is as follows:

Core diameter=3.8 nm
Core-shell diameter=7.1 nm
Shell thickness=1.71 nm

TABLE 1

| Green quantum dot | Photoluminescence properties when light source excited at a wavelength 458 nm is radiated | | | ICP analysis result and shell thickness (nm) calculated based on the results | | | Quantum dot diameter (nm) |
|---|---|---|---|---|---|---|---|
| | Wavelength (nm) | Full width at half maximum (FWHM) (nm) | Quantum yield (%) | Se/In | S/In | ZnSeS shell thickness (nm) | |
| Comparative Example 1 InP/ZnSeS | 516 | 56 | 84 | 1.2 | 2.6 | 0.75 | 3.8 |
| Example 1 InZnP/ZnS | 529 | 40 | 95 | 7.9 | 12 | 1.7 | 5.6 |
| Example 2 InZnP/ ZnS//B(S)/ZnS | 527 | 42 | 89 | 8.9 | 41 | 2.7 | 7.5 |

TABLE 2

| Green quantum dot | Photoluminescence properties when light source excited at a wavelength 458 nm is radiated | | | ICP analysis result and shell thickness (nm) calculated based on the results | | | Quantum dot diameter (nm) |
|---|---|---|---|---|---|---|---|
| | Wavelength | Full width at half maximum (FWHM) | Efficiency | Se/In | S/In | ZnS shell thickness (nm) | |
| Comparative Example 2 InP/ZnS | 633 | 57 | 99 | 0 | 1.6 | 0.60 | 5.0 |
| Example 3 InP/ZnS | 636 | 41 | 88 | 2.1 | 4.6 | 1.71 | 7.1 |

Production of Quantum Dot-Polymer Composite Pattern and Photoluminescence Properties Analysis of Produced Pattern Example 4

Figure 18:
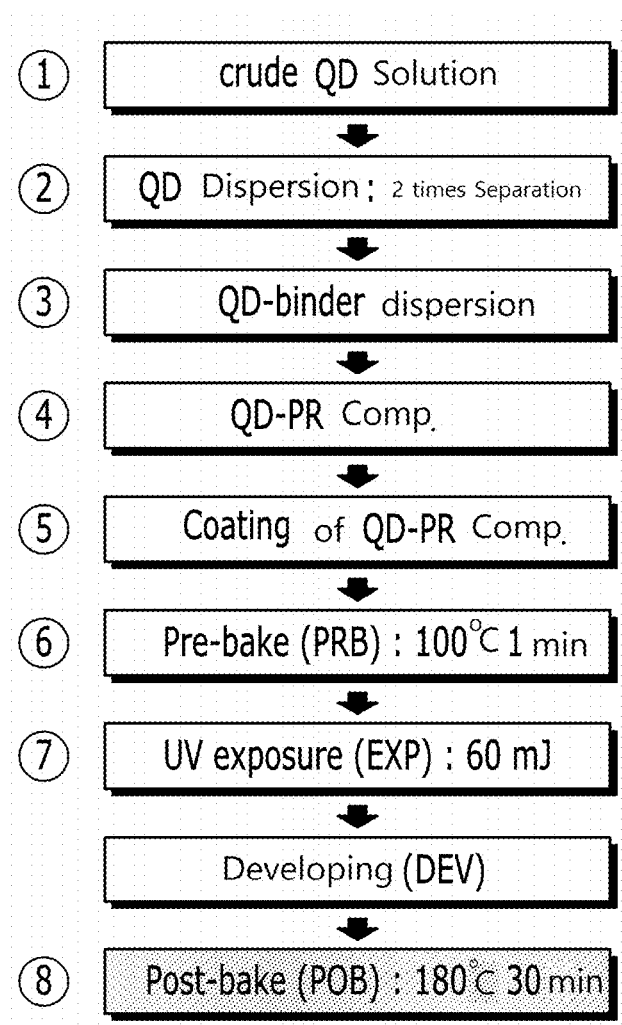
FIG. 18 is a flow chart showing a process of producing quantum dot-polymer composite patterns in Examples 4 to 6 and Comparative Examples 3 and 4.

A quantum dot polymer composite pattern is formed in the following manner. FIG. 18 shows a flow chart schematically showing a process of forming the pattern.

[1] Preparation of Quantum Dot-Binder Dispersion

Ethanol is added to a crude solution containing the quantum dot synthesized in Example 1. The solution is centrifuged, and the resultant is dispersed in chloroform. Then, ethanol is added to the obtained dispersion liquid again, the dispersion is centrifuged, and the resultant is dispersed in chloroform. (Reference: Steps 1 and 2 of FIG. 18)

The obtained chloroform dispersion liquid containing 50 g of the quantum dot (red) is mixed with 100 g of a binder (quaternary copolymer of methacrylic acid, benzyl methacrylate, hydroxyethylmethacrylate, and styrene, acid value: 130 milligrams of potassium hydroxide per gram of the binder (mg KOH/g), Molecular weight: 5,000, methacrylic acid:benzylmethacrylate hydroxyethylmethacrylate:styrene (mole ratio)=61.5%:12%:16.3%:10.2%) solution (polypropylene glycol monomethyl ether acetate solution in a concentration of 30 percent by weight, wt %) to prepare a quantum dot-binder dispersion. The quantum dot is uniformly dispersed in the quantum dot-binder dispersion. (Step 3 of FIG. 18)

[2] Preparation of Photosensitive Composition

[1] The quantum dot binder dispersion, glycol di-3-mercaptopropionate as a reactive compound including a thiol group, hexaacrylate having the following structure as a photopolymerizable monomer, oxime ester compound (Product name: PBG305, Manufacturer: Changzhou Tronly New Electronic Materials Co., Ltd.) as an initiator, and $TiO_2$ and PGMEA as a light scatter are mixed to prepare a photosensitive composition. (Step 4 of FIG. 18)

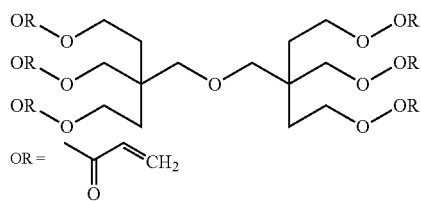

The photosensitive composition is formed as a dispersion liquid without agglomeration according to addition of the quantum dot. Based on the entire weight of the photosensitive composition, the quantum dot including an organic ligand is included in an amount of 12 wt %, a carboxylic acid group binder in an amount of 7.5 wt %, the photoinitiator in an amount of 0.2 wt %, the photopolymerizable monomer in an amount of 1 wt %, the reactive compound including a thiol group in an amount of 3 wt %, a light scatter in an amount of 15 wt %, and the balance amount of the composition is a solvent.

[3] Production of Quantum Dot-Polymer Composite Pattern

The photosensitive composition prepared in the [2] is spin-coated on a glass substrate to obtain a film (Step 5 of FIG. 18). The film is pre-baked at 100° C. (Step 6 of FIG. 18). The pre-baked film is radiated under a mask having a predetermined pattern by light (wavelength: 365 nm, intensity: 100 millijoules, mJ) for 1 second and developed by a potassium hydroxide aqueous solution (concentration: 0.043 wt. %) for 90 seconds (Step 7 of FIG. 18). After the development, the film is post-baked at 180° C. for 30 minutes to obtain a pattern (Step 8 of FIG. 18).

[4] Total Photo-Conversion Rate

Figure 19:
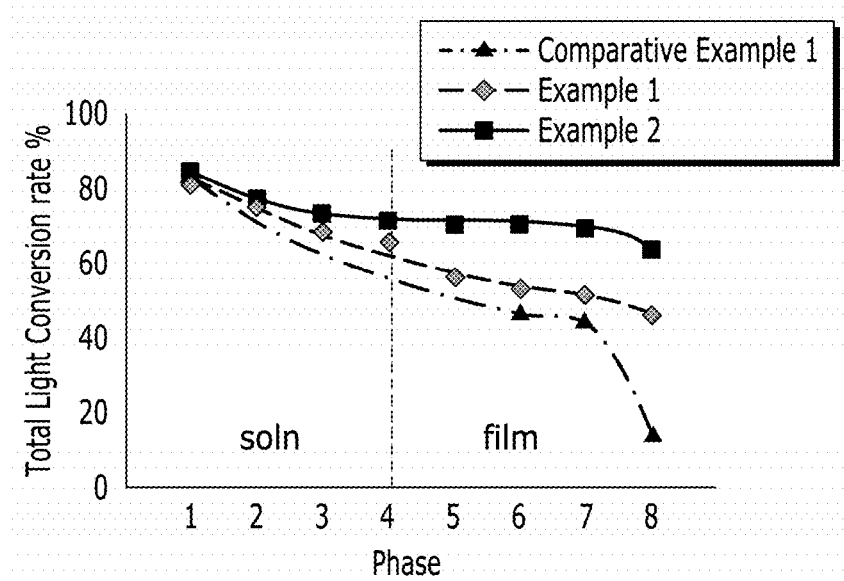
FIG. 19 is a graph of a total conversion rate (percent, %) versus step number showing changes of a total photo-conversion rate in the production processes of Examples 4 and 5 and Comparative Example 3.

A photo-conversion rate in each step (wavelength of light radiated from a light source: 450 nm) is measured, and the results are provided in Table 3 and FIG. 19.

Example 5

A quantum dot-polymer composite pattern is formed according to the same method as Example 4 except for using a crude solution containing the quantum dot according to Example 2. A photo conversion rate in each step is measured, and the results are provided in Table 3 and FIG. 19.

Comparative Example 3

A quantum dot-polymer composite pattern is formed according to the same method as Example 4 except for using a crude solution containing the quantum dot according to Comparative Example 1. A photo conversion rate in each step is measured, and the results are provided in Table 3 and FIG. 19.

TABLE 3

| | Photo-conversion rate (%) | | |
|---|---|---|---|
| | Example 4 (using quantum dot of Example 1) | Example 5 (using quantum dot of Example 2) | Comparative Example 3 (using quantum dot of Comparative Example 1) |
| step 1 | 80 | 83 | 84 |
| step 2 | 75 | 77 | |
| step 3 | 68 | 73 | |
| step 4 | 65 | 71 | |
| step 5 | 56 | 70 | |
| step 6 | 53 | 70 | 47 |
| step 7 | 52 | 69 | 45 |
| step 8 | 46 | 63 | 15 |

Referring to the results of Table 3 and FIG. 19, Example 4 including a green light emitting quantum dot and the quantum dot-polymer composite of Example 5 exhibits remarkably improved photo-conversion rate after the post-baking under severe conditions compared with Comparative Example 3.

Example 6

A quantum dot-polymer composite pattern is formed according to the same method as Example 4 except for using a crude solution containing the quantum dot according to Example 3. A photo conversion rate in each step is measured, and the results are provided in Table 4 and FIG. 20.

Comparative Example 4

A quantum dot-polymer composite pattern is formed according to the same method as Example 4 except for using a crude solution containing the quantum dot according to Comparative Example 2. A photo conversion rate in each step is measured, and the results are provided in Table 4 and FIG. 20.

TABLE 4

| | Total photo-conversion rate (%) | |
|---|---|---|
| | Example 6 | Comparative Example 4 |
| step 1 | 86 | 99 |
| step 2 | 80 | |
| step 3 | 72 | |
| step 4 | 76 | |
| step 5 | 73 | |
| step 6 | 69 | 58 |
| step 7 | 66 | 57 |
| step 8 | 47 | 13 |

Figure 20:
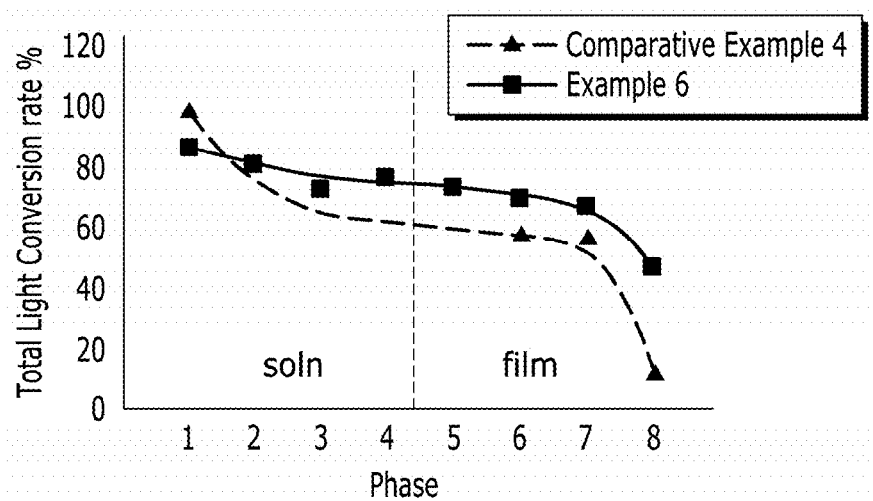
FIG. 20 is a graph of a total conversion rate (percent, %) versus step number showing changes of a total photo-conversion rate in the production processes of Example 6 and Comparative Example 4.

Referring to the results of Table 4 and FIG. 20, the quantum dot-polymer composite pattern of Example 6 shows remarkably improved photo-conversion rate after the post-baking under severe conditions compared with Comparative Example 4.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A quantum dot comprising:
a core comprising a first semiconductor material that includes indium, phosphorous, and zinc; and
a shell comprising a second semiconductor material, and disposed on the core,
wherein the first semiconductor material and the second semiconductor material are different,
wherein the shell has at least two branch portions and a valley portion connecting the at least two branch portions, at least one of the at least two connected branch portions comprises Zn, Se, and S, and a content of sulfur in the at least one branch portion increases in a direction away from the core,
wherein the quantum dot is cadmium-free.

2. The quantum dot of claim 1, wherein a content of Se in the shell decreases in a direction away from the core.

3. The quantum dot of claim 1, wherein the core comprises InP(Zn) or InZnP.

4. The quantum dot of claim 1,
wherein the first semiconductor material and the second semiconductor material comprise a lattice mismatch between a lattice of the first semiconductor material and a lattice of the second semiconductor material, wherein the lattice mismatch increases in a direction away from the core.

5. A quantum dot composition comprising:
the quantum dot of claim 1; and
a solvent.

6. A quantum dot composition comprising:
the quantum dot of claim 1;
a polymer or copolymer including carboxylic acid groups with an acid value of greater than about 50 milligrams potassium hydroxide per gram of the polymer or the copolymer; and
a metal oxide particle, a metal particle, or a combination thereof.

7. The quantum dot composition of claim 6, wherein the metal oxide particle comprises alumina, silica, zirconia, titanium oxide particulates, or zinc oxide; and
wherein the metal particle comprises gold, silver, copper, or platinum.

8. The quantum dot composition of claim 6, wherein the quantum dot composition further comprises a photopolymerizable acryl-based monomer, a reactive compound comprising at least two thiol groups, an initiator, or a combination thereof.

9. The quantum dot composition of claim 8, wherein the photopolymerizable acryl-based monomer comprises a main monomer having 1 to 6 (meth)acrylate groups.

10. The quantum dot composition of claim 8, wherein the initiator comprises a triazine-based compound, an acetophenone compound, a benzophenone compound, a thioxanthone compound, a benzoin compound, an oxime ester compound, an aminoketone compound, a phosphine or phosphine oxide compound, a carbazole-based compound, a diketone compound, a sulfonium borate-based compound, a diazo-based compound, an imidazole-based compound, or a combination thereof.

11. The quantum dot composition of claim 8, wherein the quantum dot
is present in an amount of about 1 wt % to about 40 wt % based on the total weight of the composition,
the polymer or copolymer is present in an amount of about 0.5 wt % to about 35 wt % based on the total weight of the composition,
the photopolymerizable acryl-based monomer is present in an amount of about 0.5 wt % to about 30 wt % based on the total weight of the composition,
the reactive compound comprising at least two thiol groups in amount of about 0.1 wt % to about 40 wt % based on the total weight of the composition, and
the initiator in amount of about 0.01 wt % to about 10 wt % based on the total weight of the composition.

12. A color filter comprising a quantum dot polymer composite comprising the quantum dot of claim 1, and a polymer matrix.

13. The color filter of claim 12, wherein the polymer matrix comprises a polymer or copolymer including carboxylic acid groups with an acid value of greater than about 50 milligrams potassium hydroxide per gram of the polymer or the copolymer; and
a metal oxide particle, a metal particle, or a combination thereof.

14. The color filter of claim 13, wherein the metal oxide particle comprises alumina, silica, zirconia, titanium oxide particulates, or zinc oxide; and
wherein the metal particle comprises gold, silver, copper, or platinum.

15. The color filter of claim 12, wherein the quantum dot polymer composite comprises the quantum dot in an amount of greater than or equal to about 1 wt %, and less than or equal to about 40 wt %.

16. A display device comprising a color filter and a substrate, the color filter comprising a quantum dot polymer composite comprising a plurality of quantum dots disposed in a polymer matrix;
wherein the plurality of quantum dots include a core comprising a first semiconductor material that includes indium, phosphorous, and zinc; and a shell comprising a second semiconductor material and disposed on the core, the shell comprising at least two branch portions and a valley portion connecting the at least two branch portions, at least one of the at least two connected branch portions comprises Zn, Se, and S, a content of sulfur in the at least one branch portion increases in a direction away from the core, and the first semiconductor material and the second semiconductor material are different,
wherein the quantum dots are cadmium-free.

17. The display device of claim 16, wherein a content of Se in the shell decreases in a direction away from the core.

18. The display device of claim 16, wherein the core comprises InP(Zn) or InZnP.

19. The display device of claim 16, wherein the first semiconductor material and the second semiconductor material comprise a lattice mismatch between a lattice of the first semiconductor material and a lattice of the second semiconductor material increases in a direction away from the core.

20. A method of manufacturing a quantum dot comprising a core and a shell disposed on the core, the method comprising:
   providing a core comprising a first semiconductor material that includes indium, phosphorous, and zinc, and
   adding solutions comprising shell precursors of different concentrations of sulfur and selenium step by step to a reaction system containing the core to form a shell on at least a part of a surface of the core, the shell comprising a second semiconductor material that is different from the first semiconductor material,
   wherein the shell precursors comprise precursors of Zn, Se, S, or a combination thereof,
   wherein the concentration of sulfur precursors added in a later step is greater than that in a previous step, and
   wherein the shell has at least two branch portions and a valley portion connecting the at least two branch portions,
   wherein the quantum dots are cadmium-free.

21. The quantum dot of claim 1, wherein the shell with at least two branch portions and a valley portion has a shell thickness greater than or equal to 1.7 nanometers to about 2.7 nanometers.

* * * * *